(12) United States Patent
Kobayashi

(10) Patent No.: US 11,495,263 B2
(45) Date of Patent: Nov. 8, 2022

(54) MAGNETIC DISK DEVICE AND SETTING METHOD OF RECORDING REGION

(71) Applicants: Kabushiki Kaisha Toshiba, Tokyo (JP); Toshiba Electronic Devices & Storage Corporation, Tokyo (JP)

(72) Inventor: Daisuke Kobayashi, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/197,189

(22) Filed: Mar. 10, 2021

(65) Prior Publication Data

US 2022/0076702 A1    Mar. 10, 2022

(30) Foreign Application Priority Data

Sep. 9, 2020    (JP) .............................. JP2020-151375

(51) Int. Cl.
  *G11B 21/02*    (2006.01)
  *G11B 5/012*    (2006.01)
(52) U.S. Cl.
  CPC .............. *G11B 21/02* (2013.01); *G11B 5/012* (2013.01)

(58) Field of Classification Search
  CPC ................................ G11B 20/10; G11B 21/02
  See application file for complete search history.

(56) References Cited

U.S. PATENT DOCUMENTS

| | | | |
|---|---|---|---|
| 10,289,547 B2 | 5/2019 | Malina et al. | |
| 10,381,040 B1 | 8/2019 | Boyle et al. | |
| 10,510,374 B2 | 12/2019 | Kulkarni et al. | |
| 10,528,348 B2* | 1/2020 | Liu ....................... | G06F 3/0616 |
| 10,825,478 B1* | 11/2020 | Matsumoto ........ | G11B 20/1803 |
| 2015/0254144 A1* | 9/2015 | Pantel ................... | G06F 3/0676 360/48 |
| 2017/0220463 A1 | 8/2017 | Malina et al. | |
| 2019/0013046 A1 | 1/2019 | Kulkarni et al. | |
| 2019/0220463 A1 | 7/2019 | Li et al. | |
| 2019/0244638 A1 | 8/2019 | Boyle et al. | |

* cited by examiner

*Primary Examiner* — K. Wong
(74) *Attorney, Agent, or Firm* — Allen & Overy LLP

(57) ABSTRACT

According to one embodiment, a magnetic disk device includes a controller that disposes a plurality of conventional magnetic recording division regions and a plurality of shingled write magnetic recording division regions in the user data region, sets, when receiving a command to write data to a first LBA, a first conventional magnetic recording region to a first conventional magnetic recording division region, and sets, when receiving a command to write data to a second LBA, a first shingled write magnetic recording region to a first shingled write magnetic recording division region.

18 Claims, 18 Drawing Sheets

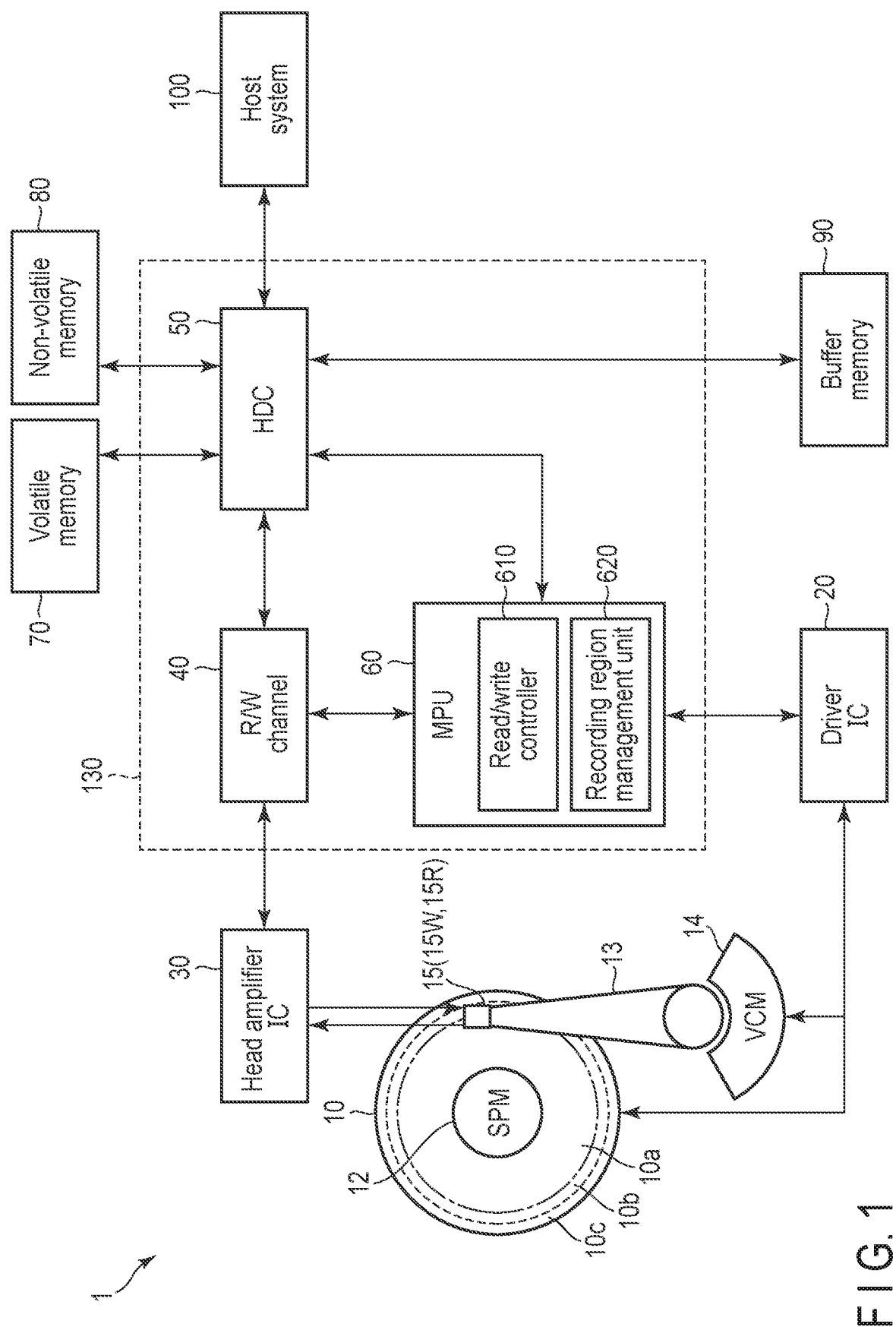
F I G. 1

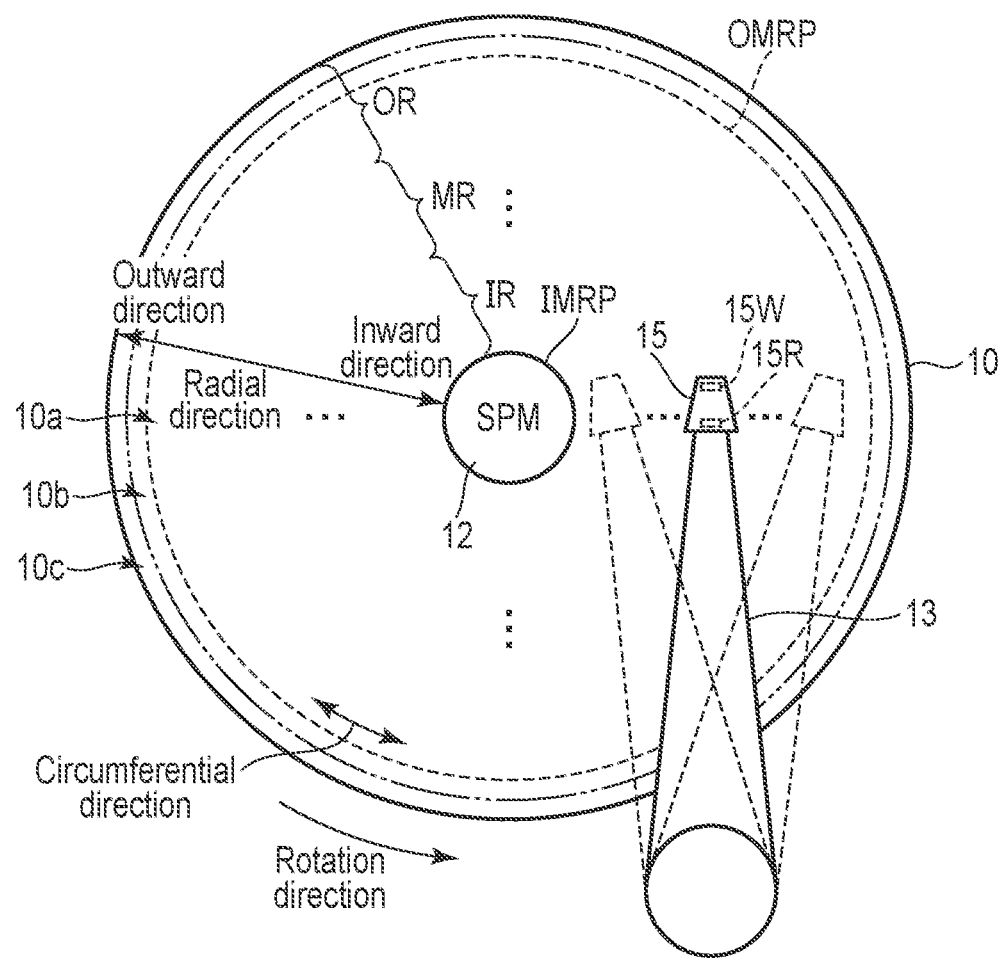
F I G. 2

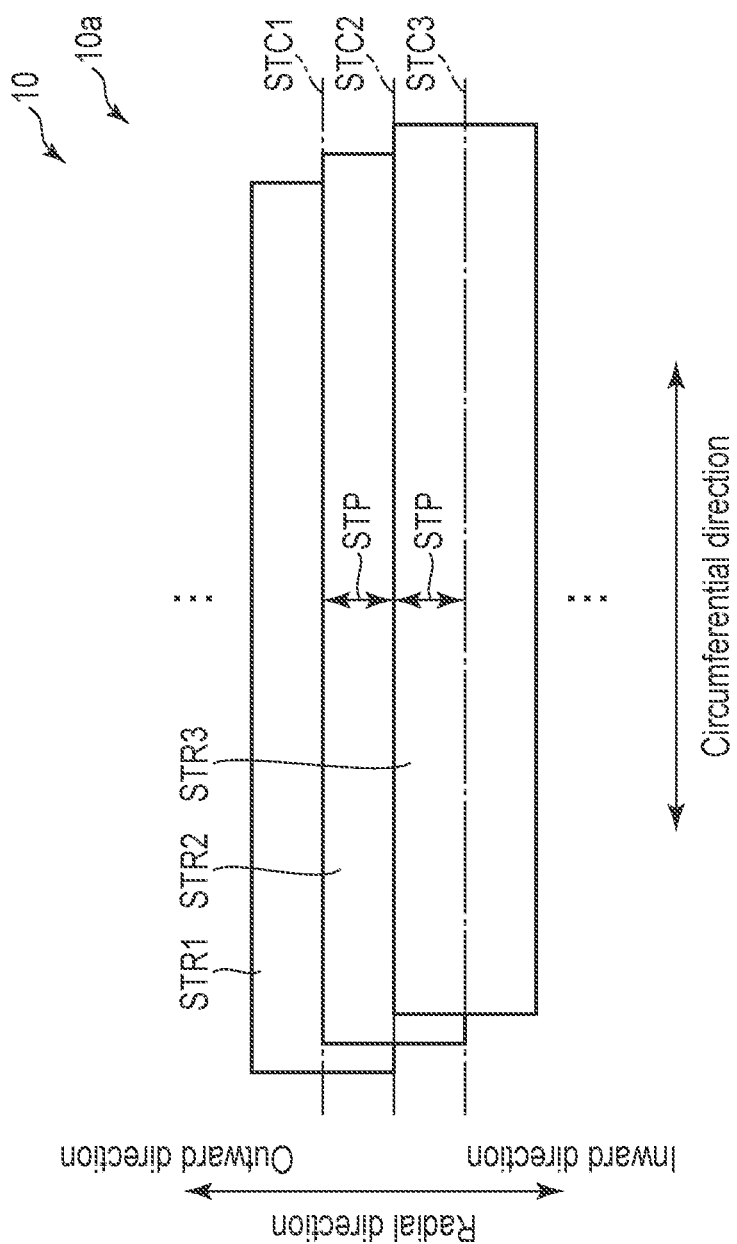
F I G. 4

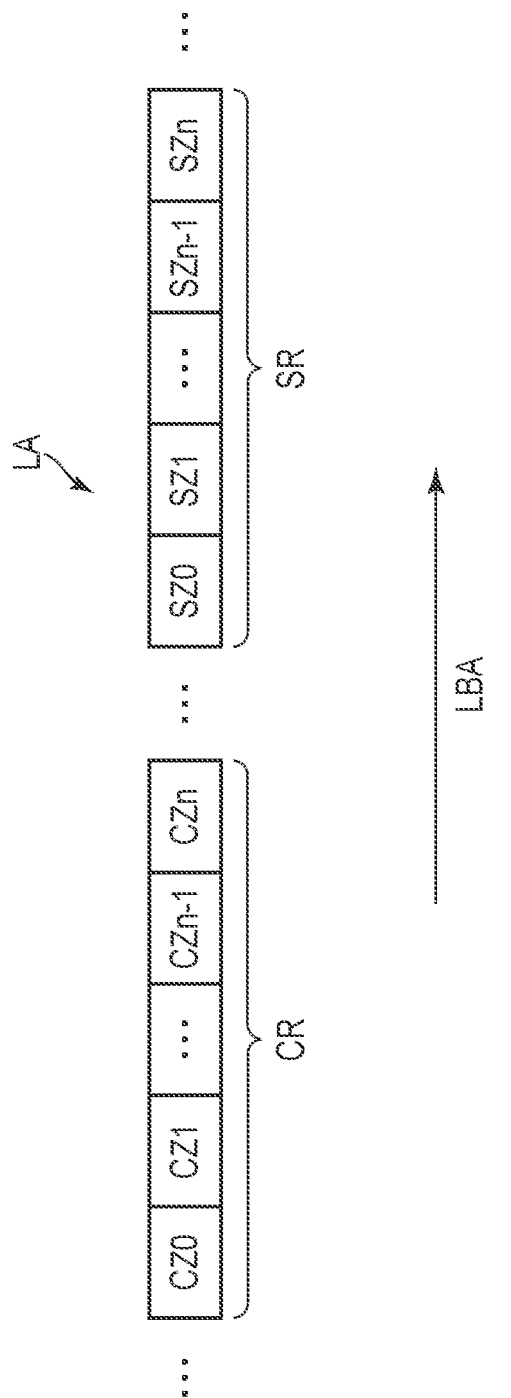
F I G. 5

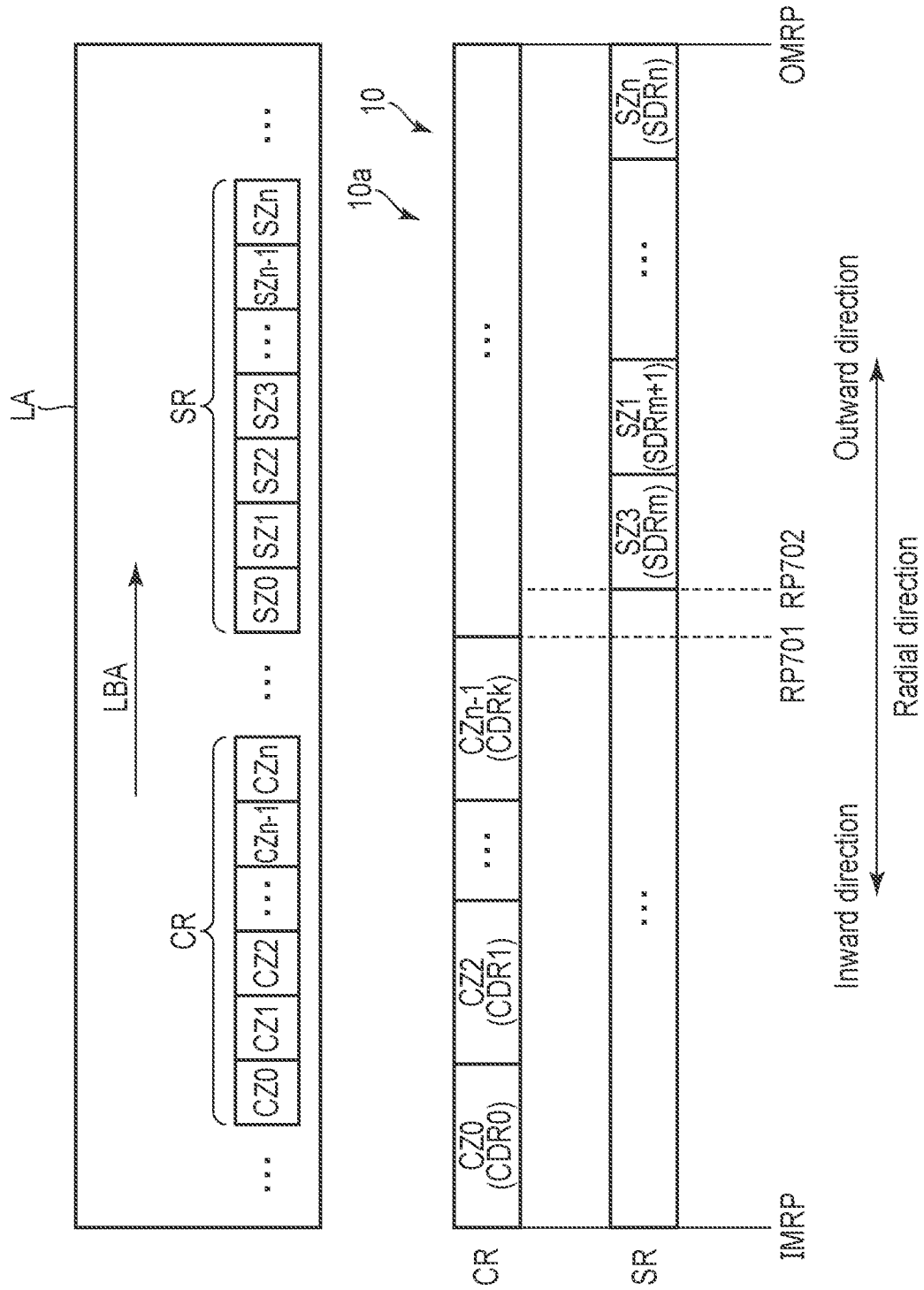
F I G. 7

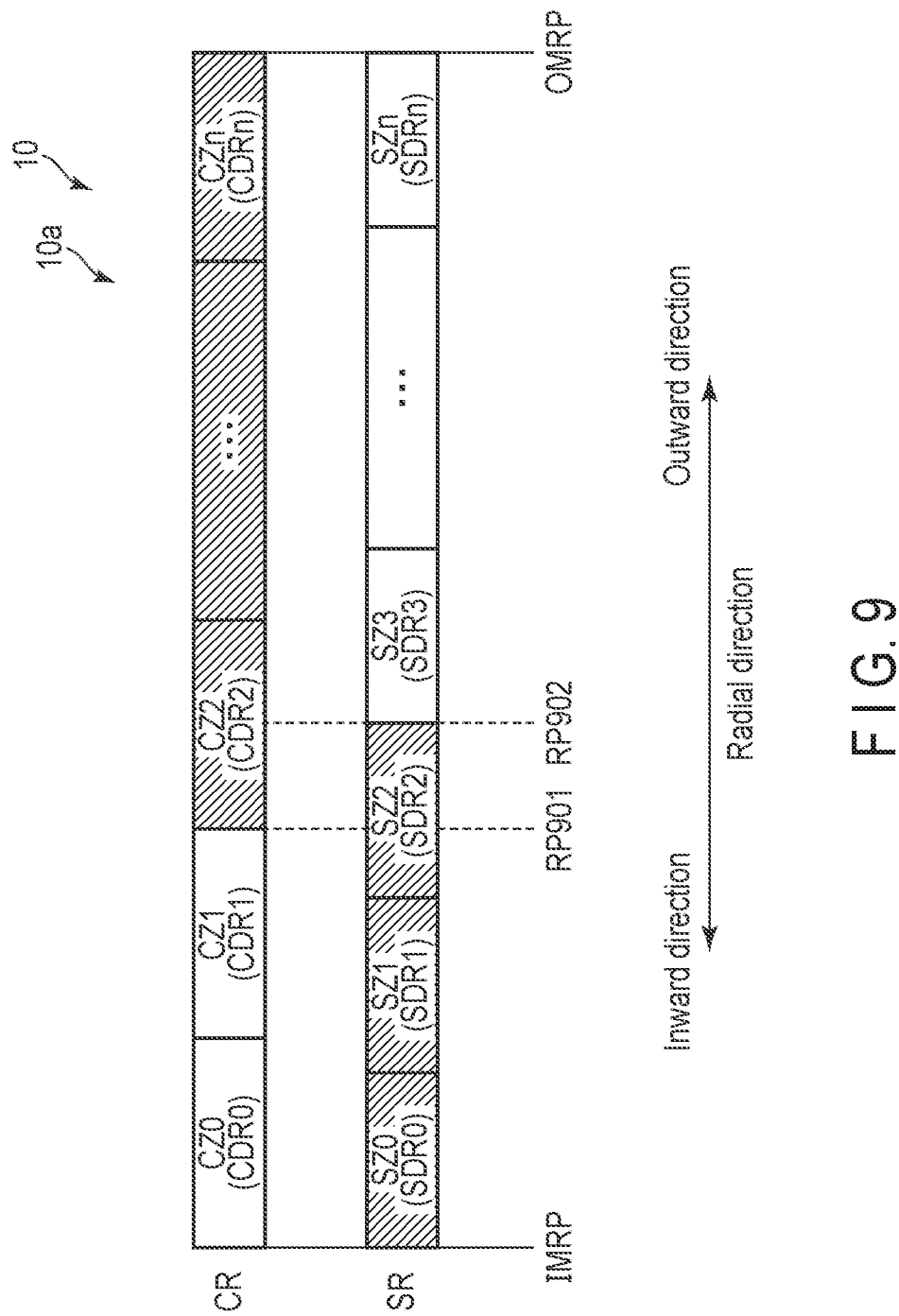
F I G. 9

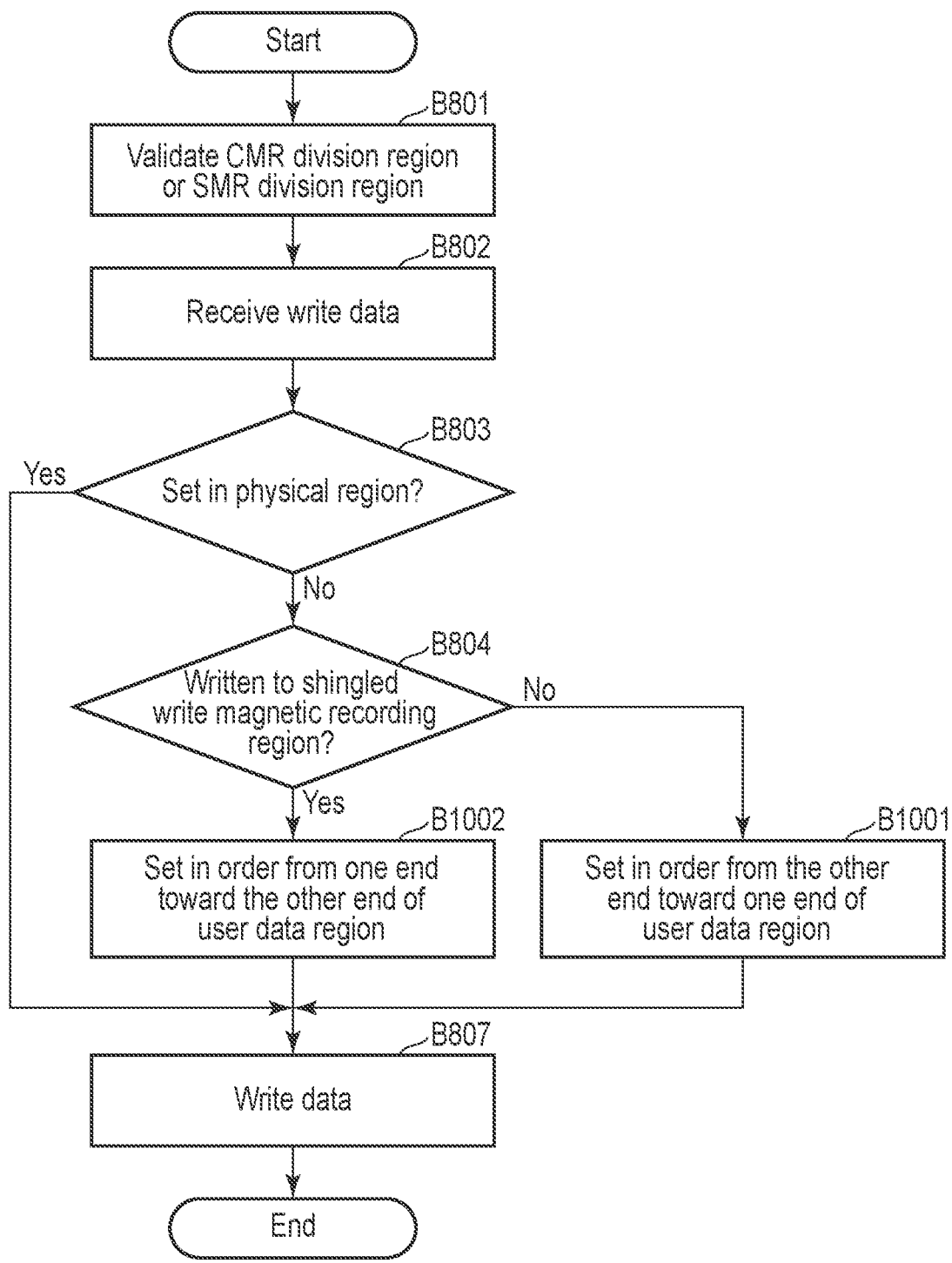
F I G. 10

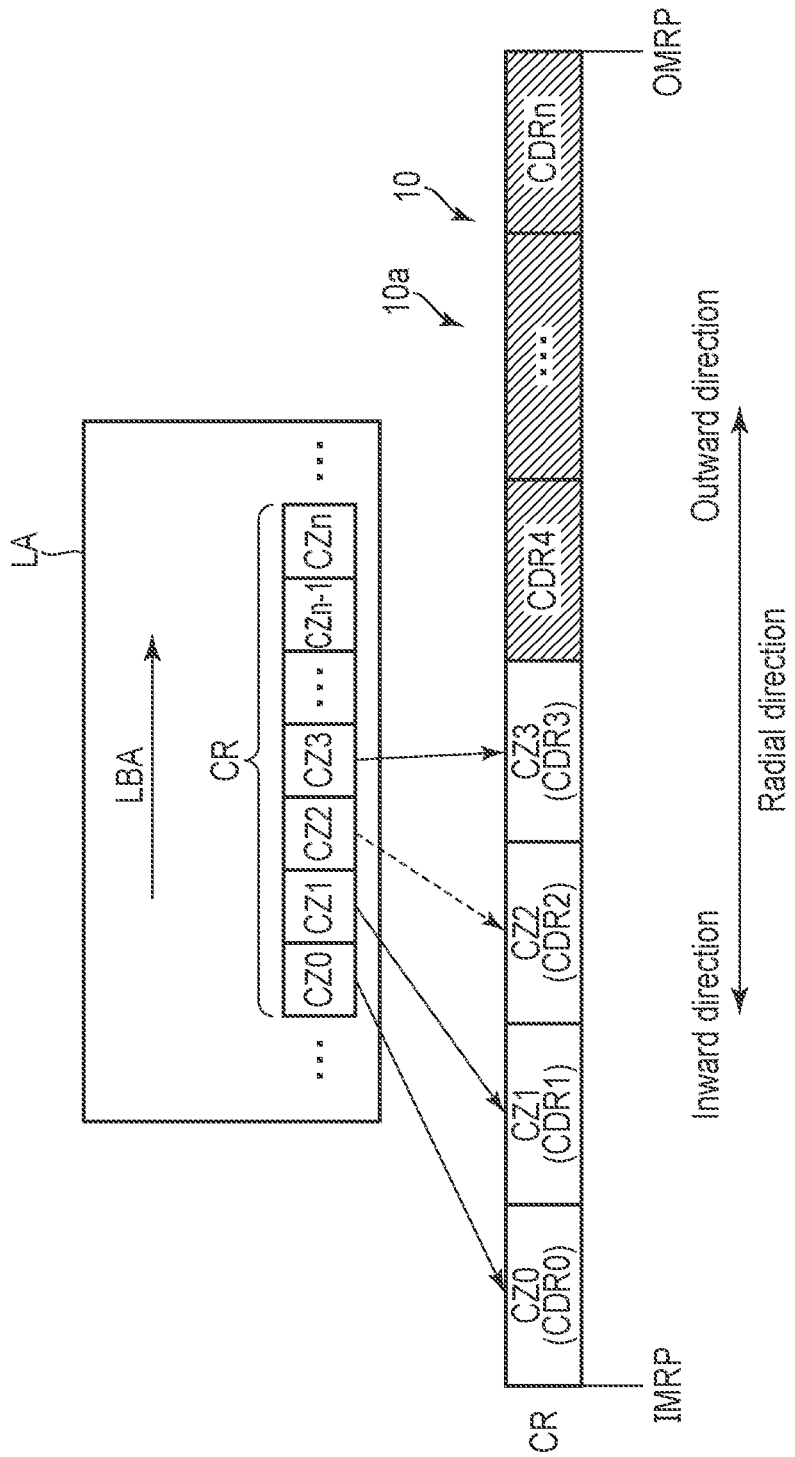
F I G. 11

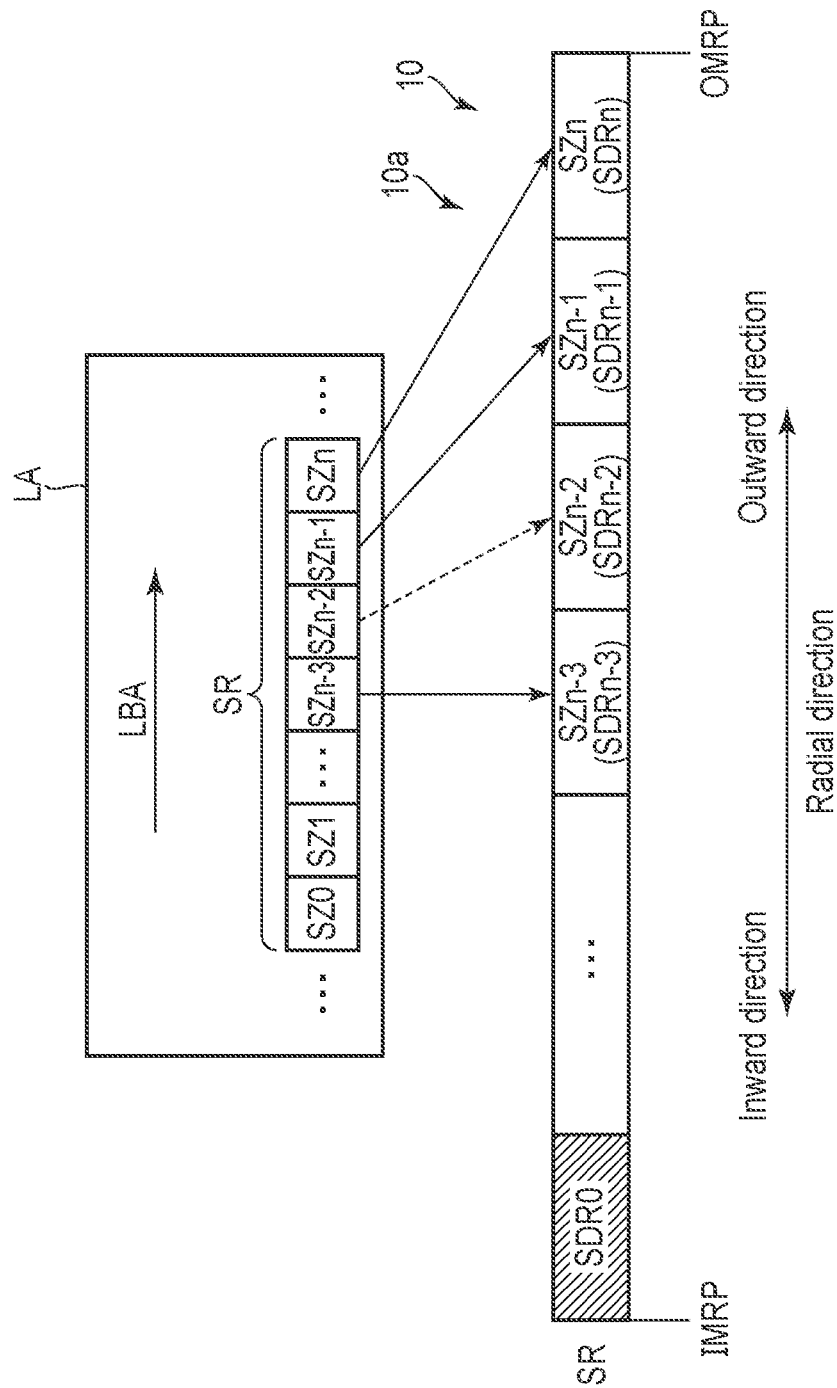
F I G. 12

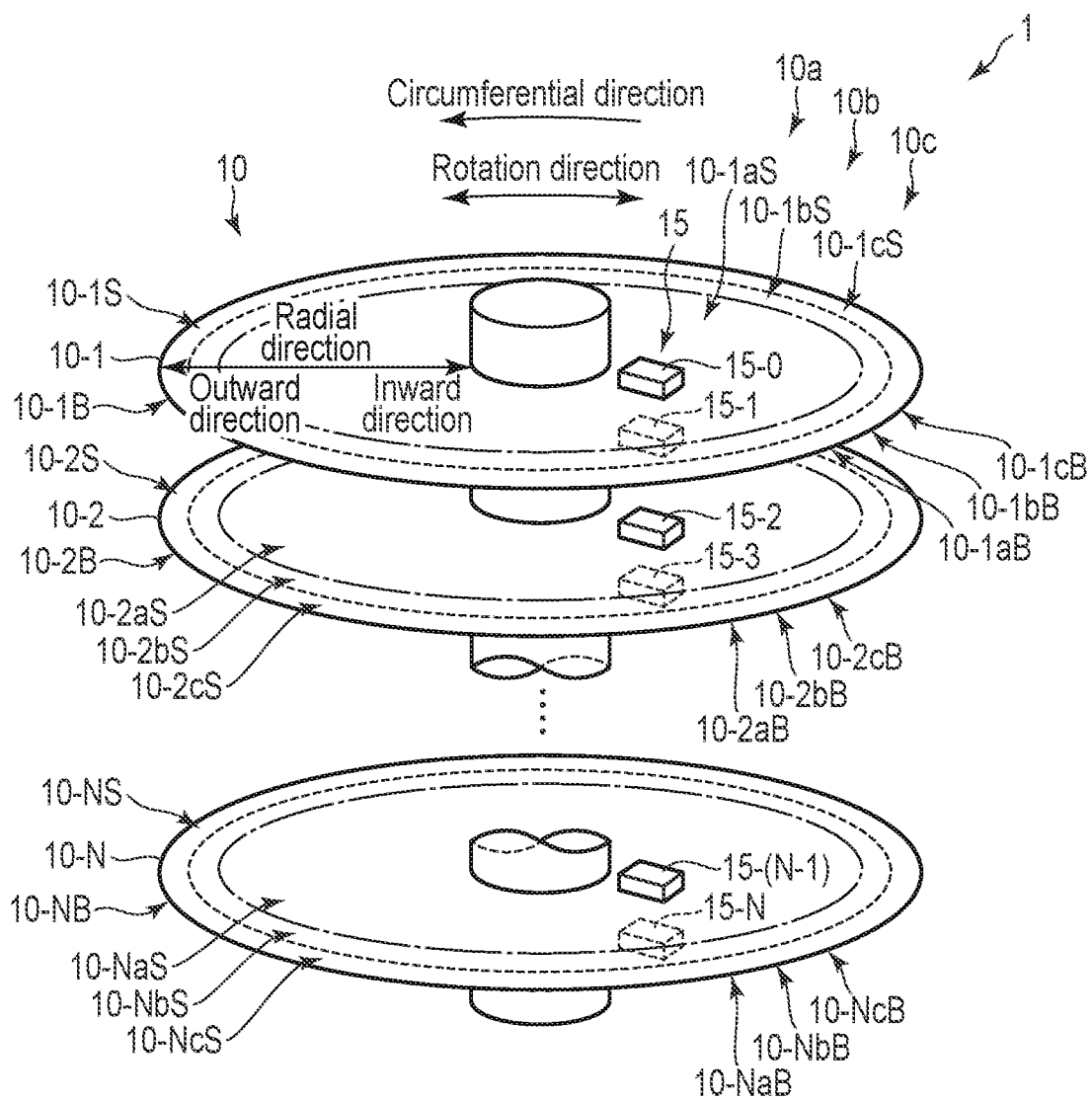
F I G. 16

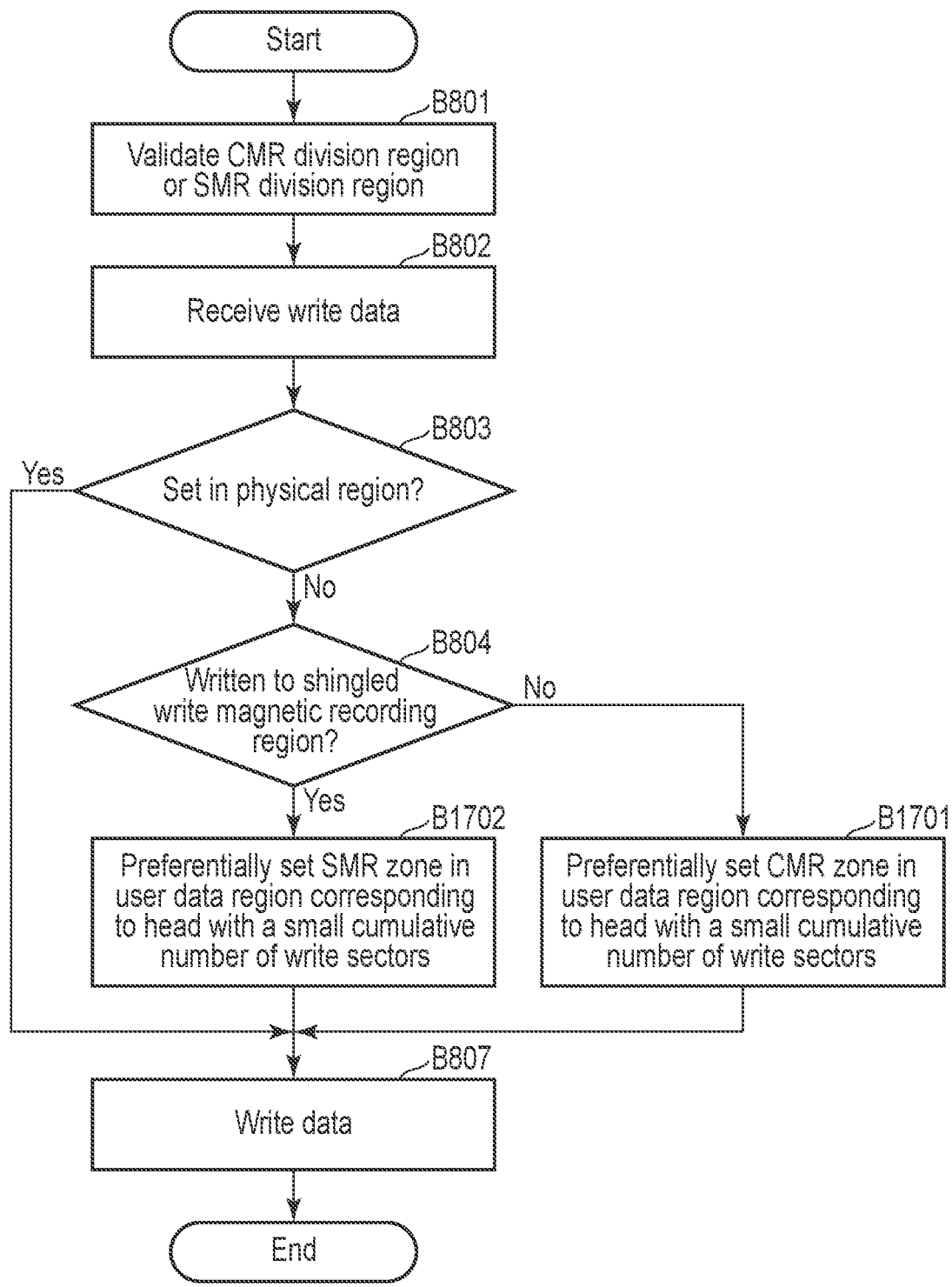
F I G. 17

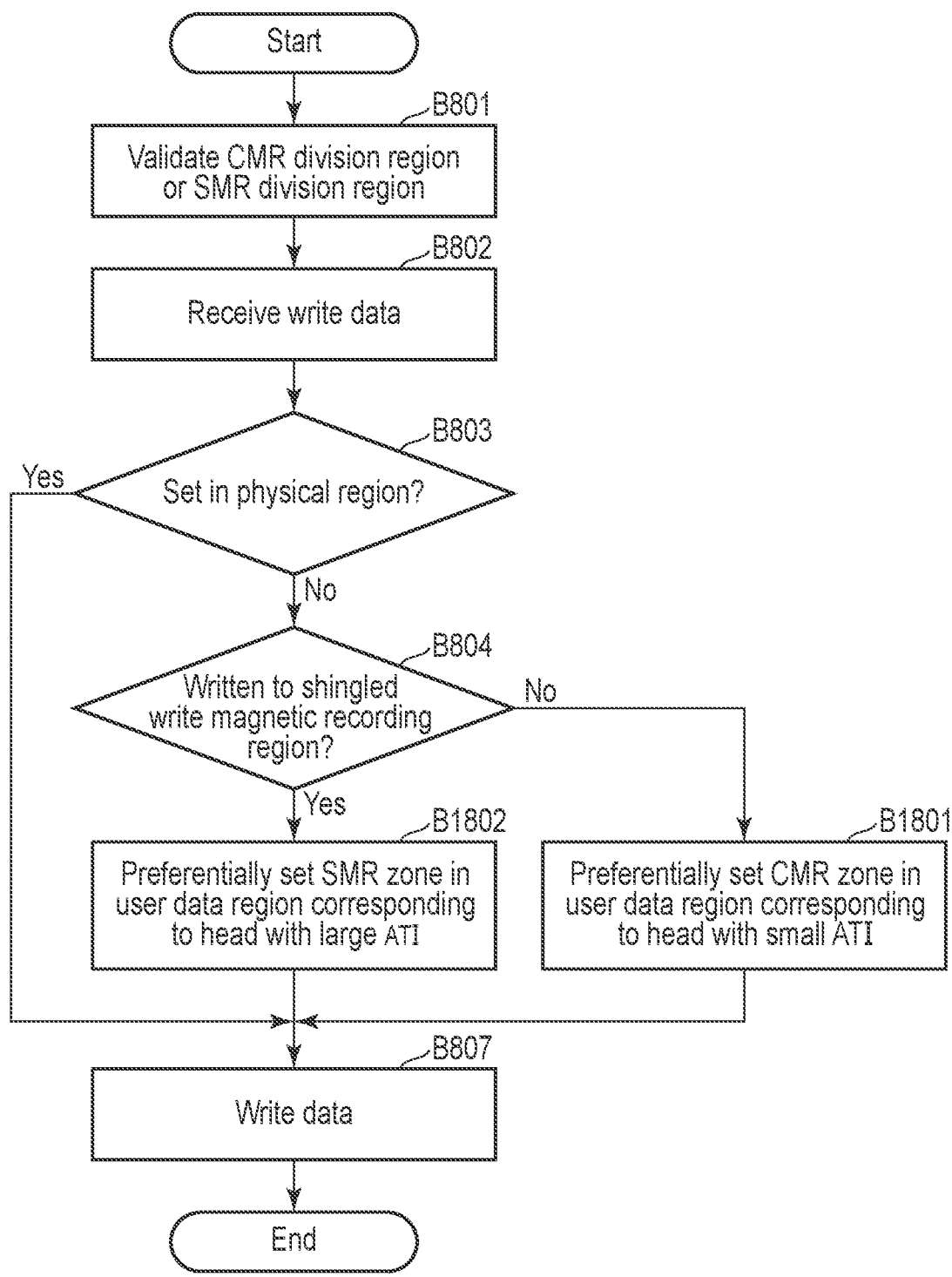
F I G. 18

MAGNETIC DISK DEVICE AND SETTING METHOD OF RECORDING REGION

CROSS-REFERENCE TO RELATED APPLICATIONS

This application is based upon and claims the benefit of priority from Japanese Patent Application No. 2020-151375, filed Sep. 9, 2020, the entire contents of which are incorporated herein by reference.

FIELD

Embodiments described herein relate generally to a magnetic disk device and a method of setting a recording region.

BACKGROUND

In recent years, magnetic disk devices having a technique that achieves high recording density have been developed. An example of a magnetic disk device that achieves high recording density includes a magnetic disk device that can execute a shingled write magnetic recording (SMR) or a shingled write recording (SWR) in which a plurality of tracks is overwritten in the radial direction of the disk. In addition, an example of another magnetic disk device that achieves high recording density includes a magnetic disk device that can selectively execute a conventional magnetic recording (CMR) in which a plurality of tracks is written at intervals in the radial direction of the disk and a shingled write magnetic recording type. The magnetic disk device that can selectively execute the conventional magnetic recording and the shingled write magnetic recording disposes for example, a region to be written by the conventional magnetic recording type (hereinafter, may be referred to as a conventional magnetic recording region) and a region to be written by the shingled write magnetic recording type (hereinafter, may be referred to as a shingled write magnetic recording region) in unit of a certain number of blocks which the host system manages. Because the radial width of the conventional magnetic recording region is different from the radial width of the shingled write magnetic recording region, the upper limit value of the capacity of data that can be written to the disk 10 may be significantly reduced depending on how the conventional magnetic recording region and the shingled write magnetic recording region are set in a disk 10.

BRIEF DESCRIPTION OF THE DRAWINGS

FIG. 1 is a block diagram showing the configuration of a magnetic disk device according to the first embodiment.

FIG. 2 is a schematic diagram showing an example of the disk according to the first embodiment.

FIG. 4 is a schematic diagram showing an example of a shingled write magnetic recording process.

FIG. 5 is a schematic diagram showing an example of a logical array of a conventional magnetic recording region and a shingled write magnetic recording region.

FIG. 7 is a schematic diagram showing an example of the physical arrangement of a CMR zone and an SMR zone according to the first embodiment.

FIG. 9 is a schematic diagram showing an example of the physical arrangement of the CMR zone and the SMR zone according to Modification 1.

FIG. 10 is a flowchart showing an example of the setting method of the shingled write magnetic recording region according to Modification 1.

FIG. 11 is a schematic diagram showing an example of the physical arrangement of the CMR zone according to Modification 2.

FIG. 12 is a schematic diagram showing an example of the physical arrangement of the SMR zone according to Modification 2.

FIG. 16 is a schematic diagram showing an example of the arrangement of the head with respect to the disk according to the second embodiment.

FIG. 17 is a flowchart showing an example of the setting method of the recording region according to the second embodiment.

FIG. 18 is a flowchart showing an example of the setting method of the recording region according to Modification 4.

DETAILED DESCRIPTION

Figure 3:
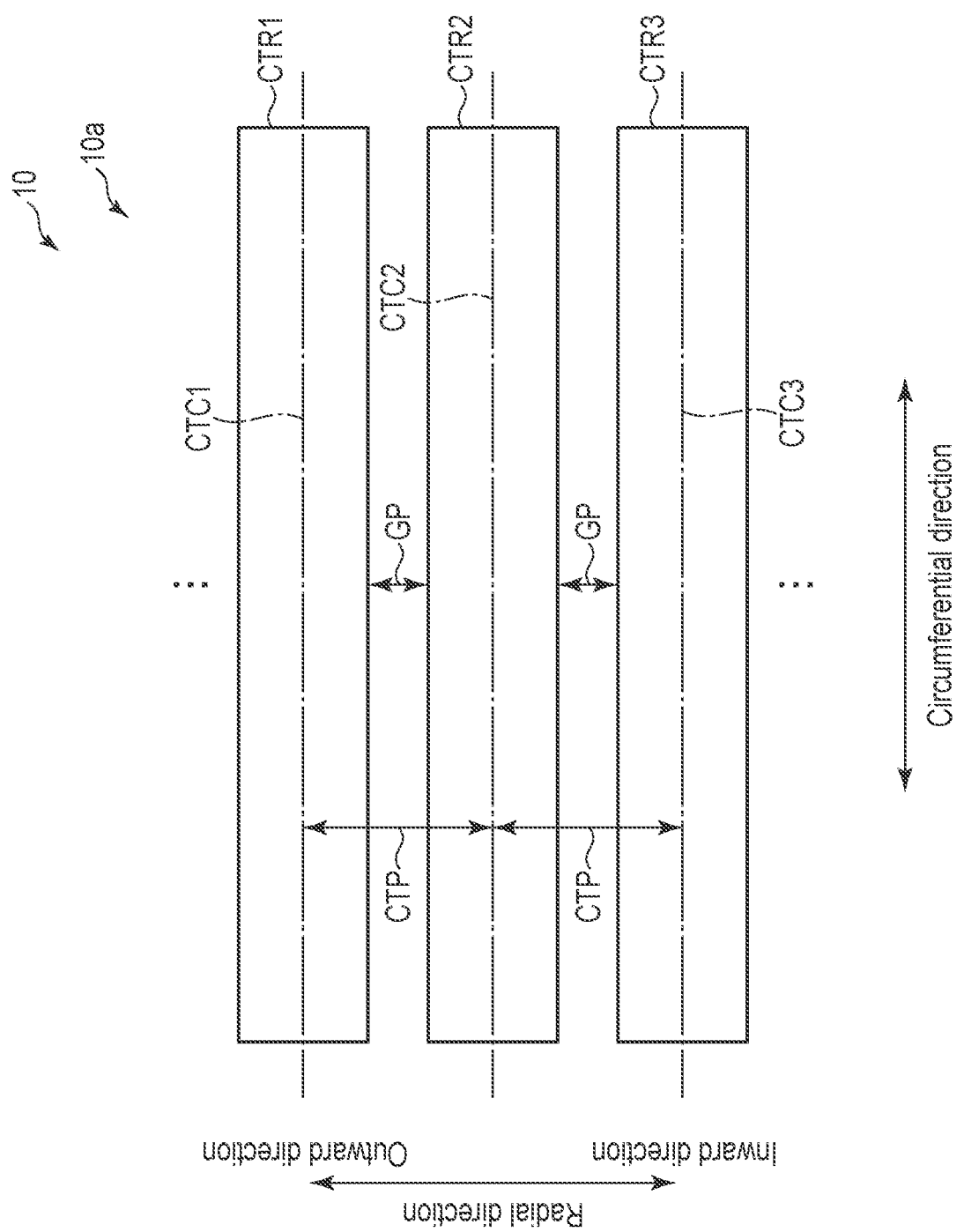
FIG. 3 is a schematic diagram showing an example of a conventional magnetic recording process.

In general, according to one embodiment, a magnetic disk device comprises: at least one disk having a user data region; at least one head that writes data to the at least one disk and that reads data from the at least one disk; and a controller that disposes a plurality of conventional magnetic recording division regions obtained by dividing the user data region in a radial direction for each first width and a plurality of shingled write magnetic recording division regions obtained by dividing the user data region in the radial direction for each second width different from the first width in the user data region so that the conventional magnetic recording division regions and the shingled write magnetic recording division regions do not overlap each other, sets, when receiving a command to write data to a first LBA with a conventional magnetic recording in which a plurality of tracks is written at intervals in the radial direction, a first conventional magnetic recording region corresponding to the first LBA to a first conventional magnetic recording division region among the conventional magnetic recording division regions, and sets, when receiving a command to write data to a second LBA with a shingled write magnetic recording in which a plurality of tracks is overwritten in the radial direction, a first shingled write magnetic recording region corresponding to the second LBA to a first shingled write magnetic recording division region among the shingled write magnetic recording division regions.

Hereinafter, embodiments will be described with reference to the drawings. It should be noted that the drawings are merely examples and do not limit the scope of the invention.

First Embodiment

FIG. 1 is a block diagram showing an example of a configuration of a magnetic disk device 1 according to the first embodiment.

The magnetic disk device 1 includes a head disk assembly (HDA) described later, a driver IC 20, a head amplifier integrated circuit (hereinafter referred to as a head amplifier IC or a preamplifier) 30, a volatile memory 70, a nonvolatile memory 80, a buffer memory (buffer) 90, and a system controller 130 which is an integrated circuit of one chip. Further, the magnetic disk device 1 is connected to a host system (hereinafter simply referred to as a host) 100. For example, the magnetic disk device 1 may support a Zoned Domains feature set.

The HDA includes a magnetic disk (hereinafter referred to as a disk) 10, a spindle motor (hereinafter referred to as an SPM) 12, an arm 13 on which a head 15 is mounted, a voice coil motor (hereinafter referred to as a VCM) 14. The disk 10 is attached to the SPM 12 and is rotated by the drive of the SPM 12. The arm 13 and the VCM 14 constitute an actuator. The actuator controls the movement of the head 15 mounted on the arm 13 to a particular position on the disk 10 by driving the VCM 14. The two or more disks 10 and the two or more heads 15 may be provided.

A user data region 10a that can be used by the user, a media cache (or sometimes referred to as media cache region) 10b that temporarily stores data before the data (or command) transferred from the host etc. is written to a particular region of the user data region 10a, and a system area 10c to which the information required for the system management is written are allocated in a region, of the disk 10, to which data can be written. Hereinafter, the direction from the inner circumference to the outer circumference of the disk 10 or the direction from the outer circumference to the inner circumference of the disk 10 is referred to as a radial direction. In the radial direction, the direction from the inner circumference to the outer circumference is referred to as the outward direction (outside), and the direction from the outer circumference to the inner circumference is referred to as the inward direction (inside). Hereinafter, a direction orthogonal to the radial direction of the disk 10 is referred to as a circumferential direction. The circumferential direction corresponds to the direction along the circumference of the disk 10. Further, a particular position of the disk 10 in the radial direction may be referred to as a radial position, and a particular position of the disk 10 in the circumferential direction may be referred to as a circumferential position. The radial position and the circumferential position may be collectively referred to as a position. The "track" has various meanings such as one region of a plurality of radially divided regions of the disk 10, a path of the head 15 at a particular radial position, data extending in the circumferential direction of the disk 10, data for one lap of data written to a track at a particular radial position, data written to a particular track of the disk 10, part of data written to a particular track of the disk 10, and the like. The "sector" has various meanings such as one region of a plurality of regions obtained by dividing a particular track of the disk 10 in the circumferential direction, data written to a particular circumferential position at the particular radial position of the disk 10, data written to a particular sector of a particular track of the disk 10, and the like. The "radial width of the track" may be referred to as a "track width". The "path passing through the center position of the track width in a particular track" is referred to as a "track center".

The head 15 has a slider as a main body, and has a write head 15W and a read head 15R mounted on the slider. The write head 15W writes data to the disk 10. The read head 15R reads the data written to the disk 10. In addition, the "write head 15W" may be simply referred to as a "head 15", the "read head 15R" may be simply referred to as the "head 15", and the write head 15W and the read head 15R may be collectively referred to as the head 15. The "center of the head 15" may be referred to as the "head 15", the "center of the write head 15W" may be referred to as the "write head 15W", and the "center of the read head 15R" may be referred to as the "read head 15R". The "center of the write head 15W" may be simply referred to as the "head 15", and the "center of the read head 15R" may be simply referred to as the "head 15". "Positioning the center of the head 15 to the track center of a particular track" may be expressed as "positioning the head 15 to a particular track", "disposing the head 15 on a particular track", "locating the head 15 on a particular track" or the like.

FIG. 2 is a schematic diagram showing an example of the disk 10 according to the present embodiment. As shown in FIG. 2, the direction in which the disk 10 rotates in the circumferential direction is referred to as the rotation direction. In the example shown in FIG. 2, the rotation direction is shown counterclockwise, but it may be in the opposite direction (clockwise). In FIG. 2, the disk 10 is divided into an inner circumference region IR located inward, an outer circumference region OR located outward, and a middle circumference region MR located between the inner circumference region IR and the outer circumference region OR.

In the example shown in FIG. 2, the disk 10 includes the user data region 10a, the media cache 10b, and the system area 10c. In FIG. 2, the user data region 10a, the media cache 10b, and the system area 10c are disposed in the order described in the outward direction. In FIG. 2, the media cache 10b is disposed adjacent to the user data region 10a in the outward direction. In other words, the media cache 10b is located between the user data region 10a and the system area 10c. Here, "adjacent" includes not only a state in which data, an object, a region, a space, etc. are disposed in contact with each other, but also a state in which they are disposed at a particular interval. In FIG. 2, the system area 10c is disposed adjacent to the media cache 10b in the outward direction. The arrangement order of the user data region 10a, the media cache 10b, and the system area 10c is not limited to the order shown in FIG. 2, and may be any order.

In the example shown in FIG. 2, the user data region 10a is disposed from the inner circumference region IR to the outer circumference region OR in the radial direction. In other words, the user data region 10a is disposed in the radial direction from an innermost radial position IMRP to a particular radial position OMRP of the outer circumference region OR of the disk 10. The radial position IMRP may be a radial position of the inner circumference region IR other than the innermost radial position. The radial position OMRP may correspond to the outermost radial position. The radial position OMRP may be a radial position of the middle circumference region MR or the inner circumference region IR. In the example shown in FIG. 2, the radial position OMRP corresponds to the boundary between the user data region 10a and the media cache 10b. The radial position OMRP may not be the boundary between the user data region 10a and the media cache region 10b. In the example shown in FIG. 2, the media cache 10b is disposed in the outer circumference region OR in the radial direction. The media cache 10b may be located in the inner circumference region IR or the middle circumference region MR. Further, the media cache 10b may be dispersedly located in the outer circumference region OR, the middle circumference region MR, and the inner circumference region IR. In the example shown in FIG. 2, the system area 10c is disposed in the outer circumference region OR in the radial direction. In other words, the system area 10c is disposed from a particular position of the outer circumference region OR to the outermost circumference of the disk 10. The system area 10c may be disposed in the middle circumference region MR or the inner circumference region IR.

Data can be written to the user data region 10a of the disk 10 by a shingled write magnetic recording (SMR), or shingled write recording SWR) type in which part of a particular track in the radial direction is overwritten with the track to be written next, or a conventional magnetic recording (CMR) type in which a track that is radially adjacent to a particular track (hereinafter, may be referred to as an adjacent track) is written with a particular interval in the radial direction from this particular track, or data can be written at random. The "adjacent track" refers to a "track adjacent outward to a particular track", a "track adjacent inward a particular track", and a "plurality of tracks adjacent outward and inward a particular track". Hereinafter, "writing data by the shingled write magnetic recording type" may be simply referred to as "shingled write magnetic recording", "performing a shingled write magnetic recording process", or "writing". The write process other than the "conventional magnetic recording process" may be referred to as the "shingled write magnetic recording process". Hereinafter, "writing data by the conventional magnetic recording type" may be simply referred to as "conventional magnetic recording", "performing a conventional magnetic recording process", or "writing".

As shown in FIG. 2, the head 15 is driven by the VCM 14 with respect to the disk 10 to rotate around the rotation axis, moves from the inward direction to the outward direction to be disposed at a particular position, or moves from the outward direction to the inward direction to be disposed at a particular position.

The driver IC 20 controls the driving of the SPM 12 and the VCM 14 according to the control of the system controller 130 (more specifically, an MPU 60 described later).

The head amplifier IC (preamplifier) 30 includes a read amplifier, a write driver, and the like. The read amplifier amplifies the read signal read from the disk 10 to output it to the system controller 130 (more specifically, a read/write (R/W) channel 40 to be described later). The write driver outputs a write current corresponding to the signal output from the R/W channel 40 to the head 15.

The volatile memory 70 is a semiconductor memory from which stored data is lost when power supply is cut off. The volatile memory 70 stores data and the like necessary for processing in respective units of the magnetic disk device 1. The volatile memory 70 is, for example, a dynamic random access memory (DRAM) or a synchronous dynamic random access memory (SDRAM).

The nonvolatile memory 80 is a semiconductor memory that records data stored even when power supply is cut off. The nonvolatile memory 80 is, for example, a NOR type or NAND type flash read only memory (FROM).

The buffer memory 90 is a semiconductor memory that temporarily records data and the like transmitted and received between the magnetic disk device 1 and a host 100. It is to be noted that the buffer memory 90 may be formed integrally with the volatile memory 70. The buffer memory 90 is, for example, a DRAM, a static random access memory (SRAM), an SDRAM, a ferroelectric random access memory (FeRAM), a magnetoresistive random access memory (MRAM), or the like.

The system controller (controller) 130 is implemented by using a large scale integrated circuit (LSI) referred to as the System-on-a-Chip (SoC) in which a plurality of elements is integrated on a single chip, for example. The system controller 130 includes the read/write (R/W) channel 40, a hard disk controller (HDC) 50, and a microprocessor or a microprocessing unit (MPU) 60. The R/W channels 40, the HDC 50, and the MPU 60 are each electrically connected to each other. The system controller 130 is electrically connected to the driver IC 20, the head amplifier IC 30, the volatile memory 70, the nonvolatile memory 80, the buffer memory 90, the host system 100, and the like.

The R/W channel 40 executes the signal process of read data and write data in response to an instruction from the MPU 60. The R/W channel 40 has a circuit or a function of modulating write data. The R/W channel 40 has a circuit or a function of measuring a signal quality of read data. The R/W channel 40 is electrically connected to the head amplifier IC 30, and the like, for example.

The HDC 50 controls data transfer between the host 100 and the R/W channel 40 in response to an instruction from the MPU 60 described later. The HDC 50 is electrically connected to, for example, the volatile memory 70, the nonvolatile memory 80, the buffer memory 90, and the like.

The MPU 60 is a main controller that controls respective units of the magnetic disk device 1. The MPU 60 controls the VCM 14 via the driver IC 20 and performs the positioning of the head 15. The MPU 60 controls a write operation of the data to the disk 10 and selects the storage destination of the write data transferred from the host 100. In addition, the MPU 60 controls the read operation of the data from the disk 10 and controls the process of the read data transferred from the disk 10 to the host 100. The MPU 60 also manages a region for recording data. The MPU 60 is connected to each unit of the magnetic disk device 1. The MPU 60 is electrically connected to the driver IC 20, the R/W channel 40, the HDC 50, and the like, for example.

The MPU 60 includes a read/write controller 610 and a recording region management unit 620. The MPU 60 executes the process of each unit, for example, the read/write controller 610 and the recording region management unit 620, on the firmware. The MPU 60 may include the respective units, for example, the read/write controller 610, the recording region management unit 620, and the like as circuits.

The read/write controller 610 controls the read process and the write process of data according to a command or the like from the host 100. The read/write controller 610 controls the VCM 14 via the driver IC 20, positions the head 15 at a particular radial position on the disk 10, and executes the read process or the write process.

The read/write controller 610 executes the conventional magnetic recording process or the shingled write magnetic recording process according to a command or the like from the host 100. In other words, the read/write controller 610 selectively executes the conventional magnetic recording process and the shingled write magnetic recording process according to a command or the like from the host 100. The read/write controller 610 may execute only the conventional magnetic recording process or may execute only the shingled write magnetic recording process. Hereinafter, the term "access" may be used including recording or writing data in a particular region, reading out or reading data from a particular region, moving the head 15 or the like to a particular region.

FIG. 3 is a schematic diagram showing an example of the conventional magnetic recording process. FIG. 3 shows tracks CTR1, CTR2, and CTR3. In FIG. 3, for example, the track widths of the tracks CTR1, CTR2, and CTR3 are the same. The track widths of the tracks CTR1 to CTR3 may be different. The terms such as "same", "identical", "match", and "equivalent" include not only the meaning of being exactly the same, but also the meaning of being different to the extent that they can be regarded as substantially the same. FIG. 3 shows a track center CTC1 of the track CTR1, a track center CTC2 of the track CTR2, and a track center CTC3 of the track CTR3. In the example shown in FIG. 3, the tracks CTR1, CTR2, and CTR3 are written at a track pitch CTP. The track center CTC1 of the track CTR1 and the track center CTC2 of the track CTR2 are away by the track pitch CTP. The track center CTC2 of the track CTR2 and the track center CTC3 of the track CTR3 are away by the track pitch CTP. The track CTR1 and the track CTR2 are away by a gap GP. The track CTR2 and the track CTR3 are away by the gap GP. The tracks CTR1 to CTR3 may be written at different track pitches. In FIG. 3, for convenience of explanation, each track is shown as a rectangle extending in the circumferential direction with a particular track width, but practically, it is curved along the circumferential direction. Further, each track may have a wavy shape extending in the circumferential direction while fluctuating in the radial direction.

In the example shown in FIG. 3, the read/write controller 610 positions the head 15 at the track center CTC1 in a particular region of the disk 10, for example, in the user data region 10a, to conventional magnetic record a particular sector of the track CTR1 or the track CTR1. The read/write controller 610 positions the head 15 at the track center CTC2 which is away from the track center CTC1 of the track CTR1 inward by the track pitch CTP in the user data region 10a to conventional magnetic record a particular sector of the track CTR2 or the track CTR2. The read/write controller 610 positions the head 15 at the track center CTC3 which is away from the track center CTC2 of the track CTR2 inward by the track pitch CTP in the user data region 10a to conventional magnetic record a particular sector of the track CTR3 or the track CTR3. The read/write controller 610 may conventional magnetic record the tracks CTR1, CTR2, and CTR3 sequentially in a particular region of the disk 10, for example, in the user data region 10a, or may perform the random conventional magnetic recording on a particular sector of the track CTR1, a particular sector of the track CTR2, and a particular sector of the track CTR3.

FIG. 4 is a schematic diagram showing an example of the shingled write magnetic recording process. FIG. 4 shows a plurality of tracks STR1, STR2, and STR3 that is consecutively overwritten in one direction in the radial direction. Hereinafter, in the shingled write magnetic recording, the region to which the data is written by the write head 15W may be referred to as a write track, and the remaining region other than the region which is overwritten with another write track in a particular track may be referred to as a read track. FIG. 4 shows the track center STC1 of the track STR1 that is not overwritten with another track, and the track center STC2 of the track STR2 that is not overwritten with another track, and the track center STC3 of the track STR3 that is not overwritten with another track. In the example shown in FIG. 4, tracks STR1, STR2, and STR3 are written at a track pitch STP. The track center STC1 of the track STR1 and the track center STC2 of the track STR2 are away by the track pitch STP. The track center STC2 of the track STR2 and the track center STC3 of the track STR3 are away by the track pitch STP. The tracks STR1 to STR3 may be written at different track pitches. In FIG. 4, the radial width of the region that is not overwritten with the track STR2 in the track STR1, and the radial width of the region that is not overwritten with the track STR3 in the track STR2 are the same. The radial width of the region that is not overwritten with the track STR2 in the track STR1, and the radial width of the region that is not overwritten with the track STR3 in the track STR2 may be different. In FIG. 4, for convenience of explanation, each track is shown as a rectangle extending in the circumferential direction with a particular track width, but practically, it is curved along the circumferential direction. Further, each track may have a wavy shape extending in the circumferential direction while fluctuating in the radial direction. In FIG. 4, three tracks are overwritten, but less than three tracks or more than three tracks may be overwritten.

In the example shown in FIG. 4, the read/write controller 610 sequentially shingled write magnetic records the tracks STR1 to STR3 inward at the track pitch STP. The read/write controller 610 may sequentially shingled write magnetic record the tracks STR1 to STR3 outward at the track pitch STP. The read/write controller 610 writes the track STR2 inward of the track STR1 at the track pitch STP, and overwrites part of the track STR1 in the inward direction with the track STR2. The read/write controller 610 writes the track STR3 inward of the track STR2 with the track pitch STP, and overwrites part of the track STR2 in the inward direction with the track STR3.

The recording region management unit 620 manages the recording region of the disk 10 (hereinafter, may be simply referred to as the disk 10) in response to an instruction from the host 100 or the like. The recording region management unit 620 sets, changes, or switches a region of the user data region 10a of the disk 10 in the particular radial direction (hereinafter, may be referred to as a radial region) in response to instructions from the host 100 or the like for example, the instructions about such as a capacity of data (hereinafter referred to as data capacity), a range in the radial direction (hereinafter, may be referred to as a radial range), an area and/or the recording type. The "radial region" includes meanings such as "a region from a particular radial position to another radial position", "a distance from a particular radial position to another radial position", "a region from a particular track to another track", "at least one track consecutively disposed side by side in the radial direction", "a distance from a particular track to another track", "a region from a particular sector to another sector radially away", "a distance from a particular sector to another sector radially away", "at least one sector consecutively disposed one by one in the radial direction", and "a particular radial position". A radial region within the media cache region 10b and system area 10c of the disk 10 may be set, changed, or switched in response to instructions from the host 100 or the like for example, the instructions about such as a capacity of data (hereinafter referred to as data capacity), a range in the radial direction (hereinafter, may be referred to as a radial range), an area and/or the recording type. Further, the recording region management unit 620 may store, as a table, the setting and the like of each radial region of the user data region 10a, the media cache 10b, and the system area 10c in a particular recording region, for example, the system area 10c of the disk 10 or the nonvolatile memory 80 or the like. For example, the recording region management unit 620 sets, changes, or switches the setting of each radial region of the user data region 10a, the media cache 10b, and the system area 10c recorded in this table, thereby setting each radial region of the user data region 10a, media cache 10b, and system area 10c.

The recording region management unit 620 sets, changes, or switches, in response to an instruction from the host 100 or the like, a particular recording region of the disk 10 as a region to which data is written by a conventional magnetic recording type, (hereafter, may be referred to as a conventional magnetic recording region, a CMR region, or sequential or before required (SOBR)), or a region to which data is written by the shingled write magnetic recording type (hereinafter, may be referred to as a shingled write magnetic recording region or an SMR region). In the Zoned Device ATA Command Set-2 (ZAC-2) proposed in T13 and the Zoned Block Commands-2 (ZBC-2) proposed in T10, the conventional magnetic recording region and the shingled write magnetic recording region can be switched according to a particular specification and a particular operation. For example, the recording region management unit 620 can set, change, or switch the conventional magnetic recording region and the shingled write magnetic recording region according to the specifications and operations of Zoned Device ATA Command Set-2 (ZAC-2) and Zoned Block Commands-2 (ZBC-2). Hereinafter, the conventional magnetic recording region and the shingled write magnetic recording region may be collectively referred to as a recording region. Further, the conventional magnetic recording region or the shingled write magnetic recording region may be simply referred to as a recording region.

The recording region management unit 620 sets, changes, or switches the conventional magnetic recording region and the shingled write magnetic recording region in a certain number of blocks or a unit of a certain amount of data managed by the host 100. The physical and logical region of the conventional magnetic recording region corresponding to data of a certain number of blocks or the amount of data managed by the host 100 may be referred to as a CMR zone. The data written to the CMR zone may be referred to as the CMR zone. The CMR zone may include at least one track. The physical and logical region of the shingled write magnetic recording region corresponding to data of a certain number of blocks or the amount of data managed by the host 100 may be referred to as an SMR zone. The data written to the SMR zone may be referred to as the SMR zone. The SMR zone may include at least one track. For example, the upper limit value of the capacity of data that can be written to the CMR zone and the upper limit value of the capacity of data that can be written to the SMR zone (hereinafter, may be referred to as the data capacity) are the same. In other words, the data capacity of the CMR zone and the data capacity of SMR are the same. In addition, the area of the CMR zone and the area of the SMR zone (hereinafter, may be simply referred to as an area) are different. In other words, the respective radial lengths (hereinafter, may be simply referred to as a length) or the respective radial widths (hereinafter, may be simply referred to as a width) of the CMR zone and the SMR zone are different. The area of the CMR zone is larger than that of the SMR zone. The length or width of the CMR zone is greater than the length or width of the SMR zone. In other words, the length or width of the SMR zone is smaller than the length or width of the CMR zone.

The recording region management unit 620 has information (hereinafter, may be referred to as CMR division disposition information) related to a disposition (hereinafter, may be referred to as a CMR division disposition) of a plurality of physical radial regions (hereinafter, may be referred to as a CMR division region) obtained by dividing the disk 10, for example, the entire region of the user data region 10a, for each width of the CMR zone, and information (hereinafter, may be referred to as SMR division disposition information) related to a disposition (hereinafter, may be referred to as an SMR division disposition) of a plurality of physical radial regions (hereinafter, may be referred to as an SMR division region) obtained by dividing the disk 10, for example, the entire region of the user data region 10a, for each width of the SMR zone. For example, the recording region management unit 620 may record the CMR division disposition information and the SMR division disposition information in a particular recording region, for example, the system area 10c of the disk 10, the nonvolatile memory 80, or the like.

When setting or changing a particular radial region to the CMR division region according to the instruction of the host 100 or the like, the recording region management unit 620 does not set or change this radial region to the SMR division region corresponding to this CMR division region. In other words, when validating the particular CMR division region according to the instruction of the host 100 or the like, the recording region management unit 620 invalidates the SMR division region corresponding to the CMR division region. For example, when validating the CMR division region corresponding to the two SMR division regions consecutively disposed side by side in the radial direction according to the instruction of the host 100 or the like, the recording region management unit 620 invalidates these two SMR division regions.

When setting or changing a particular radial region to the SMR division region according to the instruction of the host 100 or the like, the recording region management unit 620 does not set or change this radial region to the CMR division region corresponding to this SMR division region. In other words, when validating the particular SMR division region according to the instruction of the host 100 or the like, the recording region management unit 620 invalidates the CMR division region corresponding to the SMR division region. For example, when validating the SMR division region corresponding to the two CMR division regions consecutively disposed side by side in the radial direction according to the instruction of the host 100 or the like, the recording region management unit 620 invalidates these two CMR division regions.

The recording region management unit 620 may set, change, or switch the radial region that is not set to the CMR division region and the SMR division region in the user data region 10a, or where the CMR division region and the SMR division region are not validated (or invalidated) to an invalidated region, an unused region, or a free region. Hereinafter, the "invalidated region", the "non-used region", and the "free region" may be referred to as an "unused region".

The recording region management unit 620 sets a particular radial region as the CMR division region and sets another radial region different from this radial region as the SMR division region so as to minimize the unused region in the user data region 10a. In other words, the recording region management unit 620 validates the CMR division region and the SMR division region so as to minimize the unused region in the user data region 10a. For example, the recording region management unit 620 validates the CMR division region from the radial position IMRP to a particular radial position in the outward direction, and validates the SMR division region from the radial position OMRP to the radial position that does not overlap the inwardly validated CMR division region. Further, for example, the recording region management unit 620 may validate the SMR division region from the radial position IMRP to a particular radial position in the outward direction, and may validate the CMR division region from the radial position OMRP to a radial position that does not overlap the inwardly validated SMR division region. When the CMR division region and the SMR division region are validated or invalidated, the recording region management unit 620 may output (or respond) to the host 100 or the like information about the validation and invalidation of the CMR division region and the SMR division region.

The recording region management unit 620 disposes (sets or validates) the CMR zone in the order of any logical address, for example, a logical block address (LBA), in the validated CMR division region (hereinafter, may be referred to as a validated CMR region), and disposes (sets or validates) the SMR zone in the order of any LBA in the validated SMR division region (hereinafter, may be referred to as a validated SMR region).

When receiving a command from the host 100 or the like to write data to the CMR zone corresponding to a particular LBA, the recording region management unit 620 disposes (sets or validates), in the order of any LBA, the CMR zone corresponding to this particular LBA in the validated CMR region, and when writing data to the SMR zone corresponding to a particular LBA, the recording region management unit 620 disposes, in the order of any LBA, the SMR zone corresponding to this particular LBA (set or validated) in the validated SMR region. The recording region management unit 620 writes the data to the CMR zone set in the validated CMR region, and writes the data to the SMR zone set in the validated SMR region.

When receiving a command from the host 100 or the like to write data to the CMR zone corresponding to a particular LBA, the recording region management unit 620 appropriately disposes (sets or validates), in the order of the LBAs specified by the command from host 100, the CMR zone corresponding to this particular LBA in the validated CMR region, and when receiving a command from the host 100 or the like to write data to the SMR zone corresponding to a particular LBA the recording region management unit 620 appropriately disposes (sets or validates), in the order of the LBAs specified by the command from the host 100, the SMR zone corresponding to this particular LBA in the validated SMR region. In other words, when receiving a command from the host 100 or the like to write data to the CMR zone corresponding to a particular LBA, the recording region management unit 620 disposes (sets or validates), according to the order in which the data specified by the command from host 100 is written, the CMR zone corresponding to this particular LBA in the validated CMR region, and when receiving a command to write data to the SMR zone corresponding to a particular LBA from the host 100 or the like, the recording region management unit 620 disposes (sets or validates) the SMR zone corresponding to this particular LBA in the validated SMR region according to the order in which the data specified by the command from host 100 is written. The recording region management unit 620 writes the data to the CMR zone set in the validated CMR region, and writes the data to the SMR zone set in the validated SMR region.

For example, when receiving a command from the host 100 or the like to write data to the CMR zone corresponding to a particular LBA, the recording region management unit 620 disposes (sets or validates) the CMR zone of every other LBA corresponding to this particular LBA in the validated CMR region, and when receiving a command to write data to the SMR zone corresponding to a particular LBA from the host 100 or the like, the recording region management unit 620 disposes (sets or validates) the SMR zones of every other LBA corresponding to this particular LBA in the validated SMR region. The recording region management unit 620 writes the data to the CMR zone set in the validated CMR region, and writes the data to the SMR zone set in the validated SMR region.

FIG. 5 is a schematic diagram showing an example of a logical array LA of a conventional magnetic recording region and a shingled write magnetic recording region.

In the logical array LA shown in FIG. 5, the logical address of the SMR region SR, for example, the LBA of the SMR region SR, is the LBA after the logical address of the conventional magnetic recording region CR, for example, the LBA of the conventional magnetic recording region CR. In the logical array LA shown in FIG. 5, the conventional magnetic recording region CR includes CMR zones CZ0, CZ1, ..., CZn−1, and CZn. The LBAs are assigned to the CMR zones CZ0, CZ1, ..., CZn−1, and CZn in the order described. For example, the LBA of the CMR zone CZ1 is the LBA after the LBA of the CMR zone CZ0, the LBA of the CMR zone CZn−1 is the LBA after the LBA of the CMR zone CZ1, and the LBA of the CMR zone CZn is the LBA after the LBA of the CMR zone CZn−1. In the logical array LA shown in FIG. 5, the shingled write magnetic recording region SR includes SMR zones SZ0, SZ1, ..., SZn−1, and SZn. The LBAs are assigned to the SMR zones SZ0, SZ1, ..., SZn−1, and SZn in the order described. For example, the LBA of the SMR zone SZ1 is the LBA after the LBA of the SMR zone SZ0, the LBA of the SMR zone SZn−1 is the LBA after the LBA of the SMR zone SZ1, and the LBA of the SMR zone SZn is the LBA after the LBA of the SMR zone SZn−1.

Figure 6:
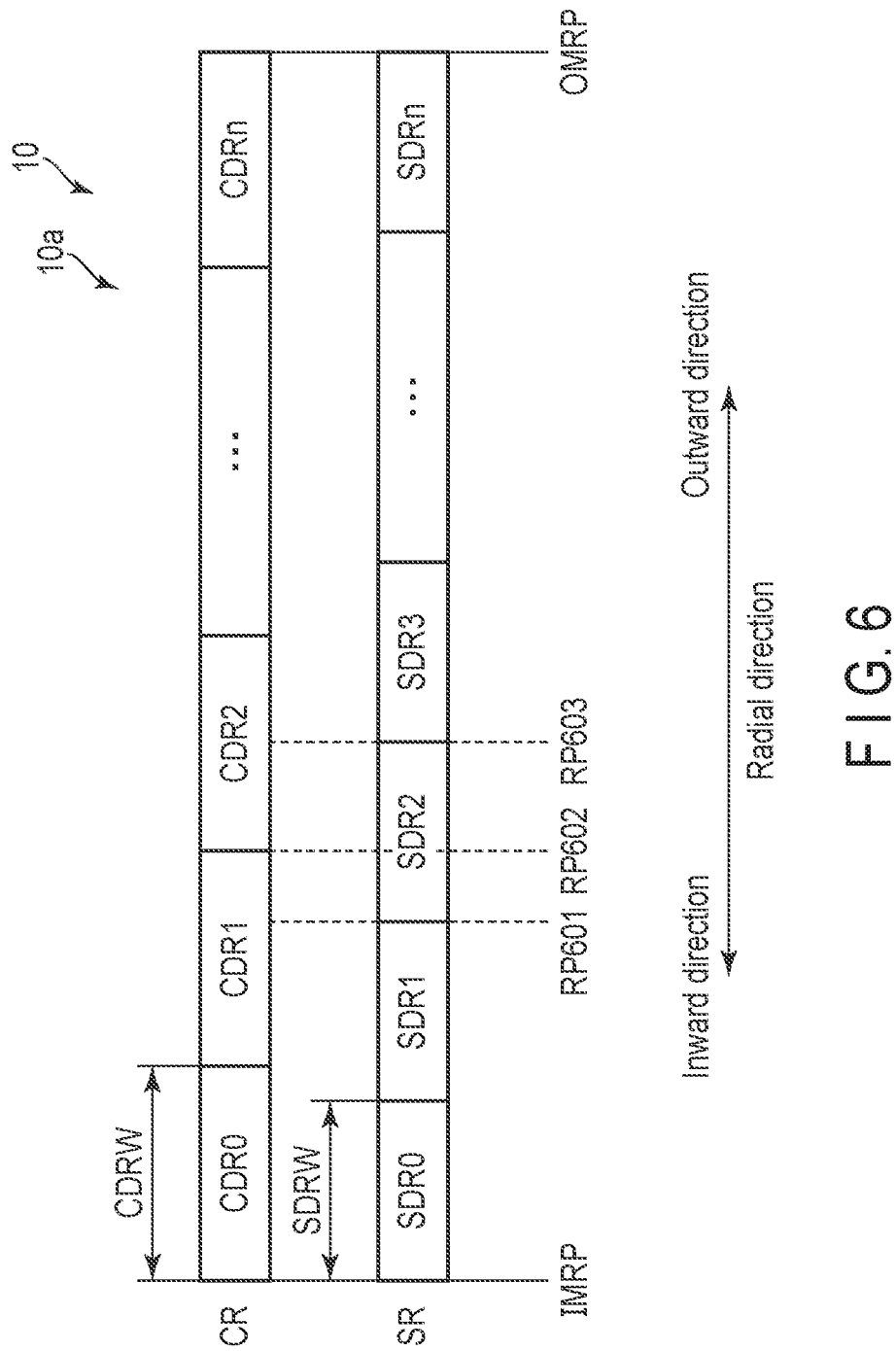
FIG. 6 is a schematic diagram showing an example of a validation process of an SMR division region and a CMR division region.

FIG. 6 is a schematic diagram showing an example of validation process of the SMR division region and the CMR division region. FIG. 6 shows the radial position IMRP, a radial position RP601, a radial position RP602, a radial position RP603, and the radial position OMRP. The radial position RP601 is located outward of the radial position IMRP and the radial position RP602 is located outward of the radial position RP601. The radial position RP603 is located outward of the radial position RP602 and the radial position OMRP is located outward of the radial position RP603. In the example shown in FIG. 6, the conventional magnetic recording region CR and the shingled write magnetic recording region SR are shown. In the physical arrangement of the conventional magnetic recording region CR and the shingled write magnetic recording region SR in the user data region 10a shown in FIG. 6, the conventional magnetic recording region CR includes a plurality of CMR division regions CDR0, CDR1, CDR2, ..., and CDRn obtained by dividing the user data region 10a. The plurality of CMR division regions CDR0, CDR1, CDR2, ..., and CDRn is consecutively disposed outward from the radial position IMRP to the radial position OMRP in the order described. Note that the plurality of CMR division regions CDR0, CDR1, CDR2, ..., and CDRn may be consecutively disposed inward from the radial position OMRP to the radial position IMRP in the order described. In FIG. 6, the CMR division region CDR1 is adjacent to the CMR division region CDR0 in the outward direction, and the CMR division region CDR2 is adjacent to the CMR division region CDR1 in the outward direction. A plurality of CMR division regions CDR0, CDR1, CDR2, ..., and CDRn has the same width CDRW. Note that the plurality of CMR division regions CDR0, CDR1, CDR2, ..., and CDRn may have different widths. In the physical arrangement of the conventional magnetic recording region CR and the shingled write magnetic recording region SR in the user data region 10a shown in FIG. 6, the shingled write magnetic recording region SR includes a plurality of SMR division regions SDR0, SDR1, SDR2, SDR3, . . . , and SDRn obtained by dividing the user data region 10*a*. The plurality of SMR division regions SDR0, SDR1, SDR2, SDR3, . . . , and SDRn is consecutively disposed outward from the radial position IMRP toward the radial position OMRP in the order described. The plurality of SMR division regions SDR0, SDR1, SDR2, SDR3, . . . , and SDRn may be consecutively disposed inward from the radial position OMRP toward the radial position IMRP in the order described. In FIG. 6, the SMR division region SDR1 is adjacent to the SMR division region SDR0 in the outward direction, the SMR division region SDR2 is adjacent to the SMR division region SDR1 in the outward direction, and the SMR division region SDR3 is adjacent to the SMR division region SDR2 in the outward direction. A plurality of SMR division regions SDR0, SDR1, SDR2, SDR3, . . . , and SDRn has the same width SDRW. The plurality of SMR division regions SDR0, SDR1, SDR2, . . . , and SDRn may have different widths. The width of the SMR division region is smaller than the width of the CMR division region located at the same radial position as the SMR division region. In addition, the width of the SMR division region is smaller than the width of the CMR division region located inside the SMR division region. In FIG. 6, the width SDRW is smaller than the width CDRW. The boundary between the SMR division regions SDR1 and SDR2 is equivalent to the radial position RP601 and corresponds to the CMR division region CDR1. The boundary between the CMR division regions CDR1 and CDR2 is equivalent to the radial position RP602 and corresponds to the SMR division region SDR2. The boundary between the SMR division regions SDR2 and SDR3 is equivalent to the radial position RP603 and corresponds to the CMR division region CDR2.

In the example shown in FIG. 6, the recording region management unit 620 validates the SMR division region SDR2. When the SMR division region SDR2 is validated, the recording region management unit 620 invalidates the CMR division regions CDR1 and CDR2. The recording region management unit 620 validates CMR division regions other than CMR division regions CDR1 and CDR2. In this case, by validating one SMR division region SDR2, the two CMR division regions CDR1 and CDR2 are required to be invalidated, so that the upper limit value of the capacity of data that can be written to the user data region 10*a* can be greatly reduced.

In the example shown in FIG. 6, the recording region management unit 620 validates the CMR division region CDR1. When the CMR division region CDR1 is validated, the recording region management unit 620 invalidates the SMR regions SDR1 and SDR2. The recording region management unit 620 validates the SMR division regions other than the SMR division regions SDR1 and SDR2. In this case, by validating one CMR division region CDR1, two SMR division regions SDR1 and SDR2 are required to be invalidated, so that the upper limit value of the capacity of data that can be written to the user data region 10*a* can be greatly reduced.

In the example shown in FIG. 6, the recording region management unit 620 validates the CMR division regions CDR0 and CDR1. When the CMR division regions CDR0 and CDR1 are validated, the recording region management unit 620 can validate the SMR division regions SDR3 to SDRn. When the SMR division regions SDR3 to SDRn are validated, the recording region management unit 620 can not validate the SMR division region SDR0 to SDR2. The recording region management unit 620 sets the radial region from the radial position RP602 to the radial position RP603 between the CMR division region CDR1 and the SDR division region SDR3 as an unused region. In this case, it is possible to suppress a decrease in the upper limit value of the capacity of data that can be written to the user data region 10*a*.

FIG. 7 is a schematic diagram showing an example of the physical arrangement of the CMR zone and the SMR zone according to the present embodiment. FIG. 7 corresponds to part of FIGS. 5 and 6. FIG. 7 shows the logical array LA of the conventional magnetic recording region CR and the shingled write magnetic recording region SR that are instructed, transferred or stored by the magnetic disk device 1, for example, the head amplifier IC 30, the R/W channel 40, the HDC 50, the MPU 60, the volatile memory 70, the nonvolatile memory 80, the buffer memory 90, etc., and the physical arrangement of the conventional magnetic recording region CR and the shingled write magnetic recording region SR in the user data region 10*a*. In the logical array LA shown in FIG. 7, the conventional magnetic recording region CR further includes the CMR zone CZ2. The LBAs are assigned to the CMR zones CZ0, CZ1, CZ2, . . . , CZn−1, and CZn in the order described. For example, the LBA of the CMR zone CZ2 is the LBA after the LBA of the CMR zone CZ1. In the logical array LA shown in FIG. 7, the shingled write magnetic recording region SR further includes the SMR zones SZ2 and SZ3. The LBAs are assigned to the SMR zones SZ0, SZ1, SZ2, SZ3, . . . , SZn−1, and SZn in the order described. For example, the LBA of the SMR zone SZ2 is the LBA after the LBA of the SMR zone SZ1, the LBA of the SMR zone SZ3 is the LBA after the LBA of the SMR zone SZ2, and the LBA of the SMR zone SZn−1 is the LBA after the LBA of the SMR zone SZ3.

FIG. 7 shows the radial position IMRP, a radial position RP701, a radial position RP702, and the radial position OMRP. The radial position RP701 is located outward of the radial position IMRP, the radial position RP702 is located outward of the radial position RP701, and the radial position OMRP is located outward of the radial position RP702. In the physical arrangement of the conventional magnetic recording region CR and the shingled write magnetic recording region SR in the user data region 10*a* shown in FIG. 7, the conventional magnetic recording region CR further includes the CMR division region CDRk obtained by dividing the user data region 10*a*. The CMR division region CDRk is located inward of the CMR division region CDRn shown in FIG. 6. The outward end of the CMR division region CDRk corresponds to the radial position RP701. The plurality of CMR division regions CDR0, CDR1, . . . , and CDRk is consecutively disposed outward from the radial position IMRP to the radial position RP701 in the order described. The plurality of CMR division regions CDR0, CDR1, . . . , and CDRk may be consecutively disposed inward from the radial position RP701 to the radial position IMRP in the order described. In FIG. 7, the CMR division region CDR1 is adjacent to the CMR division region CDR0 in the outward direction. In the physical arrangement of the conventional magnetic recording region CR and the shingled write magnetic recording region SR in the user data region 10*a* shown in FIG. 7, the shingled write magnetic recording region SR further includes a plurality of SMR division regions SDRm and SDRm+1 obtained by dividing the user data region 10*a*. The SMR division region SDRm is located outward of the SMR division region SDR3 shown in FIG. 6. The SMR division region SDRm+1 is located outward of the SMR division region SDRm. The SMR division region SDRn is located outward of the SMR division region SDRm+1. The inward end of the SMR division region SDRm corresponds to the radial position RP702. The plurality of SMR division regions SDRm, SDRm+1, ..., and SDRn is consecutively disposed outward from the radial position RP702 to the radial position OMRP in the order described. The plurality of SMR division regions SDRm, SDRm+1, ..., and SDRn may be consecutively disposed inward from the radial position OMRP to the radial position RP702 in the order described. In FIG. 7, the SMR division region SDRm+1 is adjacent to the SMR division region SDRm in the outward direction.

In the example shown in FIG. 7, the recording region management unit 620 validates the CMR division regions CDR0 to CDRk and validates the SMR division regions SDRm to SDRn so as to minimize the unused region. The recording region management unit 620 sets the CMR zone of every other LBA in the logical array LA in the CMR division region, and sets the SMR zone of every other LBA in the logical array LA in the SMR division region.

In the example shown in FIG. 7, when receiving a command from the host 100 or the like to write data to the CMR zone corresponding to a particular LBA, the recording region management unit 620 sets (or disposes) the CMR zone CZ0 as the CMR division region CDR0, sets (or disposes) the CMR zone CZ2 as the CMR division region CDR1, and sets (or disposes) the CMR zone CZn−1 as the CMR division region CDRk. The recording region management unit 620 writes data to the CMR zone CZ0 set in the user data region 10a, writes data to the CMR zone CZ2 set in the user data region 10a, and writes data to the CMR zone CZn−1 set in the user data region 10a.

In the example shown in FIG. 7, when receiving a command from the host 100 or the like to write data to the SMR zone corresponding to the particular LBA, the recording region management unit 620 sets (or disposes) the SMR zone SZ3 as the SMR division region SDRm, sets (or disposes) the SMR zone SZ1 as the SMR division region SDRm+1, and sets (or disposes) the SMR zone SZn as the SMR division region SDRn. The recording region management unit 620 writes data to the SMR zone SZ3 set in the user data region 10a, writes data to the SMR zone SZ1 set in the user data region 10a, and writes data to the SMR zone SZn set in the user data region 10a.

Figure 8:
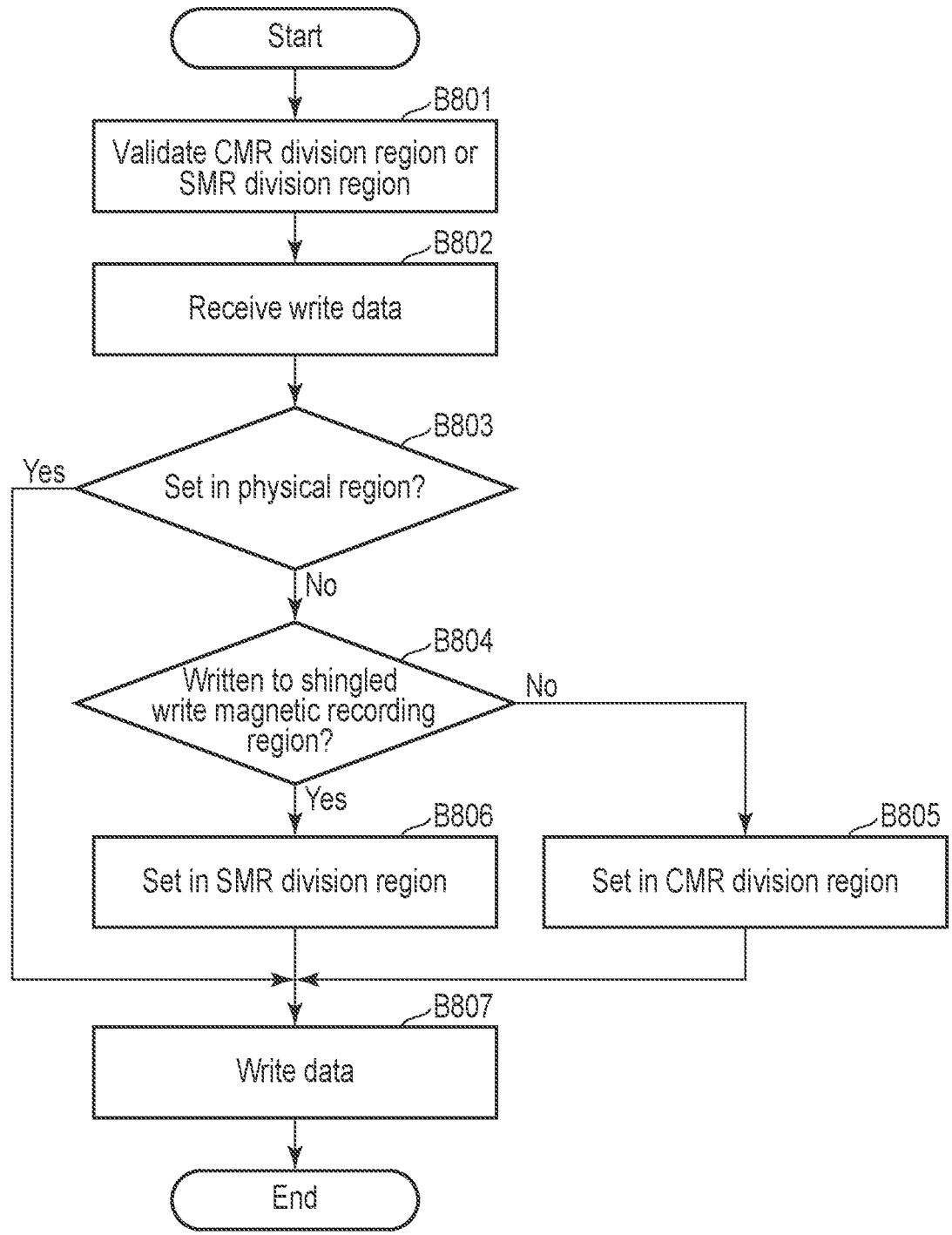
FIG. 8 is a flowchart showing an example of the setting method of the recording region according to the first embodiment.

FIG. 8 is a flowchart showing an example of method of setting a recording region according to the present embodiment.

The MPU 60 validates the CMR division region and the SMR division region of the user data region 10a to minimize the unused region according to the command or instruction from host 100 or the like (B801) and respond to the host 100. The MPU 60 receives the write data (or command) transferred from the host 100 or the like (B802). The MPU 60 determines whether the recording region of the LBA corresponding to the received write data (or command) is set in a physical region, for example, the user data region 10a (B803).

When the recording region of the LBA corresponding to the received write data (or command) is set to a physical region, for example, the user data region 10a (YES in B803), the MPU 60 advances the process to B807. When the recording region of the LBA corresponding to the received write data (or command) is not set to a physical region, for example, the user data region 10a (NO in B803), the MPU 60 determines whether data is written to the shingled write magnetic recording region SR (B804). In other words, when the recording region of the LBA corresponding to the received write data (or command) is not set to the user data region 10a, the MPU 60 determines whether data is written to the shingled write magnetic recording region SR or the conventional magnetic recording region CR.

When it is determined that data is written to the conventional magnetic recording region CR (NO in B804), the MPU 60 sets the CMR zone of the LBA corresponding to the write data (or command) in a particular CMR division region (B805) and advances the process to B807. When it is determined that data is written to the shingled write magnetic recording region SR (YES in B804), the MPU 60 sets the SMR zone of the LBA corresponding to the write data (or command) in a particular SMR division region (B806), writes the data (B807), and ends the process.

According to the first embodiment the magnetic disk device 1 validates the CMR division region and the SMR division region of the user data region 10a to minimize the unused region according to a command or instruction from the host 100 or the like. When receiving write data (or a command) from the host 100 or the like, the magnetic disk device 1 sets the CMR zone or the SMR zone of the LBA corresponding to this write data (or command) in the CMR division region or the SMR division region of the user data region 10a, and write data to the CMR zone or the SMR zone set in the user data region 10a. Since the magnetic disk device 1 can minimize the unused region, it is possible to suppress a decrease in the upper limit value of the capacity of data that can be written to the disk 10. Therefore, the magnetic disk device 1 can efficiently write data to the disk 10.

Next, the magnetic disk device according to the other embodiments and the other modifications of the above-described first embodiment will be described. In other modifications and other embodiments, the same reference numerals are attached to the same parts as those in the above first embodiment, and a detailed description thereof will be omitted.

(Modification 1)

The magnetic disk device 1 of Modification 1 is different from the magnetic disk device 1 of the first embodiment described above in the method of setting the recording region.

The recording region management unit 620 sets (disposes or validates) a plurality of the CMR zones corresponding to a plurality of LBAs corresponding to write data (or commands) in one direction in the order in which write data (or commands) is received in a plurality of validated CMR regions consecutively disposed side by side from the validated CMR region located at one end (hereinafter, may be simply referred to as one end of the user data region 10a) of the user data region 10a in the radial direction to the validated CMR region located in the direction of the other end (hereinafter, may be simply referred to as the other end of the user data region 10a), of the user data region 10a, opposite to the one end of the radial direction. In addition, the recording region management unit 620 sets (disposes or validates) a plurality of the SMR zones corresponding to a plurality of LBAs corresponding to write data (or commands) in one direction in the order in which write data (or commands) is received in a plurality of validated SMR regions consecutively disposed side by side from the validated SMR region located at the other end of the user data region 10a to the validated SMR region located in the direction of one end of the user data region 10a.

FIG. 9 is a schematic diagram showing an example of the physical arrangement of the CMR zone and the SMR zone according to Modification 1. FIG. 9 corresponds to part of FIGS. 5 and 6. FIG. 9 shows the radial position IMRP, a radial position RP901, a radial position RP902, and the radial position OMRP. The radial position RP901 is located outward of the radial position IMRP, the radial position RP902 is located outward of the radial position RP901, and the radial position OMRP is located outward of the radial position RP902. In the example shown in FIG. 9, the outward end of the CMR division region CDR1 corresponds to the radial position RP901 and corresponds to the SMR division region SDR2. The inward end of the SMR division region SDR3 corresponds to the radial position RP902 and corresponds to the CMR division region CDR2. In FIG. 9, the CMR division region and the SMR division region are validated in white and invalidated in shade.

In the example shown in FIG. 9, when receiving a command (or instruction) to write data to the CMR zone CZ0 from the host 100 or the like, the MPU 60 sets (or disposes) the CMR zone CZ0 as the CMR division region CDR0, and when receiving a command (or instruction) to write data to the CMR zone CZ1 from host 100 or the like, the MPU 60 sets (or disposes) the CMR zone CZ1 as CMR division region CDR1.

In the example shown in FIG. 9, when receiving a command (or instruction) to write data to the SMR zone SZn from the host 100 or the like, the MPU 60 sets (or disposes) the SMR zone SZn as the SMR division region SDRn, and when receiving a command (or instruction) to write data to the SMR zone SZ3 from host 100 or the like, the MPU 60 sets (or disposes) the SMR zone SZ3 as the SMR division region SDR3.

FIG. 10 is a flowchart showing an example of a method of setting the shingled write magnetic recording region according to Modification 1.

The MPU 60 validates the CMR division region and the SMR division region of the user data region 10*a* according to a command or an instruction from the host 100 or the like (B801) and responds to the host 100. The MPU 60 receives the write data (or command) transferred from the host 100 or the like (B802). The MPU 60 determines whether the recording region of the LBA corresponding to the received write data (or command) is set in the user data region 10*a* (B803).

When the recording region of the LBA corresponding to the received write data (or command) is set in the user data region 10*a* (YES in B803), the MPU 60 advances the process to B807. When the recording region of the LBA corresponding to the received write data (or command) is not set in the user data region 10*a* (NO in B803), the MPU 60 determines whether data is written to the shingled write magnetic recording region SR or to the conventional magnetic recording region CR (B804).

When it is determined that data is written to the conventional magnetic recording region CR (NO in B804), the MPU 60 sets the CMR zone of the LBA corresponding to the write data (or command) received from the host 100 or the like in the CMR division region in the order from one end of the user data region 10*a* toward the other end opposite to the one end (B1001), and advances the process to B807. When it is determined that data is written to the shingled write magnetic recording region SR (YES in B804), the MPU 60 sets the SMR zone of the LBA corresponding to the write data (or command) received from the host 100 or the like in the SMR division region in the order from the other end of the user data region 10*a* toward one end (B1002), writes data (B807), and ends the process.

According to Modification 1, the magnetic disk device 1 sets the CMR zone of the LBA corresponding to the write data (or command) received from the host 100 in the CMR division region in the order from one end of the user data region 10*a* toward the other end opposite to the one end, sets the SMR zone of the LBA corresponding to the write data (or command) received from the host 100 in the SMR division region in the order from the other end of the user data region 10*a* toward one end, and writes data to the CMR zone and the SMR zone set in the user data region 10*a*. Therefore, the magnetic disk device 1 can efficiently write data to the disk 10.

(Modification 2)

The magnetic disk device 1 of Modification 2 is different from the magnetic disk device 1 of the first embodiment and Modification 1 described above in the setting method of the conventional magnetic recording region CR and the shingled write magnetic recording region SR.

The recording region management unit 620 sets (disposes or validates) a plurality of the CMR zones of a plurality of LBAs corresponding to write data (or commands) to be consecutively disposed side by side in the validated CMR region according to the order of the LBAs, and sets (disposes or validates) a plurality of the SMR zones of a plurality of LBAs corresponding to write data (or commands) to be consecutively disposed side by side in the validated SMR region according to the order of the LBAs.

FIG. 11 is a schematic diagram showing an example of the physical arrangement of the CMR zones according to Modification 2. FIG. 11 corresponds to part of FIGS. 5, 6, and 7. In the logical array LA shown in FIG. 11, the conventional magnetic recording region CR further includes the CMR zone CZ3. The LBAs are assigned to the CMR zones CZ0, CZ1, CZ2, CZ3, . . . , CZn−1, and CZn in the order described. For example, the LBA of the CMR zone CZ3 is the LBA after the LBA of the CMR zone CZ2 and the LBA before the CMR zone CZn−1. In FIG. 11, the CMR division region and the SMR division region are validated in white and invalidated in shade.

In the physical arrangement of the conventional magnetic recording region CR in the user data region 10*a* shown in FIG. 11, the conventional magnetic recording region CR further includes the CMR division regions CDR3 and CDR4 obtained by the user data region 10*a*. The CMR division region CDR3 is located outward of the CMR division region CDR2. The CMR division region CDR3 is adjacent to the CMR division region CDR2 in the outward direction. The CMR division region CDR4 is located outward of the CMR division region CDR3 and is located inward of the CMR division region CDRn. The CMR division region CDR4 is adjacent to the CMR division region CDR3 in the outward direction. The plurality of CMR division regions CDR0, CDR1, CDR2, CDR3, CDR4, . . . , and CDRn is consecutively disposed outward from the radial position IMRP toward the radial position OMRP in the order described. Note that the plurality of CMR division regions CDR0, CDR1, CDR2, CDR3, CDR4, . . . , and CDRn may be consecutively disposed inward from the radial position OMRP toward the radial position IMRP in the order described.

In the example shown in FIG. 11, when the MPU 60 receives commands in the order of the LBAs of the CMR zone CZ0, the LBA of the CMR zone CZ1, and the LBA of the CMR zone CZ3 so as to write data in the order of the CMR zones CZ0, CZ1, and CZ3 from host 100 or the like, the MPU 60 sets (or disposes) the CMR zone CZ0 as the CMR division region CDR0, sets (or disposes) the CMR zone CZ1 as the CMR division region CDR1, sets (or disposes) the CMR zone CZ2 as the CMR division region CDR2, and sets (or disposes) the CMR zone CZ3 as the CMR division region CDR3.

FIG. 12 is a schematic diagram showing an example of the physical arrangement of the SMR zones according to Modification 2. FIG. 12 corresponds to part of FIGS. 5, 6, and 7. In the logical array LA shown in FIG. 12, the shingled write magnetic recording region SR further includes the SMR zones SZn-2 and SZn-3. The LBAs are assigned to the SMR zones SZ0, SZ1, . . . , SZn-3, SZn-2, SZn-1, and SZn in the order described. For example, the LBA of the SMR zone SZn-2 is the LBA before the LBA of the SMR zone SZn-1, and the LBA of the SMR zone SZn-3 is the LBA before the LBA of the SMR zone SZn-3. The LBA of the SMR zone SZn-3 is the LBA before the LBA of the SMR zone SZn-3 and the LBA after the LBA of the SMR zone SZ1. In FIG. 12, the CMR division region and the SMR division region are validated in white and invalidated in shade.

In the physical arrangement of the shingled write magnetic recording region SR in the user data region 10*a* shown in FIG. 12, the shingled write magnetic recording region SR further includes the SMR division regions SDRn-1, SDRn-2, and SDRn-3 obtained by the user data region 10*a*. The SMR division region SDRn-1 is located inward of the SMR division region SDRn. The SMR division region SDRn-1 is adjacent to the SMR division region SDRn in the inward direction. The SMR division region SDRn-2 is located inward of the SMR division region SDRn-1. The SMR division region SDRn-2 is adjacent to the SMR division region SDRn-1 in the inward direction. The SMR division region SDRn-3 is located inward of the SMR division region SDRn-2 and is located outward of the SMR division region SDR0. The SMR division region SDRn-3 is adjacent to the SMR division region SDRn-2 in the inward direction. The plurality of SMR division regions SDR0, . . . , SDRn-3, SDRn-2, SDRn-1, and SDRn is consecutively disposed outward from the radial position IMRP toward the radial position OMRP in the order described. The plurality of SMR division regions SDR0, . . . , SDRn-3, SDRn-2, SDRn-1, and SDRn may be consecutively disposed inward from the radial position OMRP to the radial position IMRP in the order described.

In the example shown in FIG. 12, when the MPU 60 receives commands in the order of the LBA of the SMR zone SZn, the LBA of SMR zone SZn-1, and the LBA of the SMR zone SZn-3 so as to write data in the order of the SMR zones SZn, SZn-1, and SZn-3 from host 100 or the like, the MPU 60 sets (or disposes) the SMR zone SZn as the SMR division region SDRn, sets (or disposes) the SMR zone SZn-1 as the SMR division region SDRn-1, sets (or disposes) the SMR zone SZn-2 as the SMR division region SDRn-2, and sets (or disposes) the SMR zone SZn-3 as the SMR division region SDRn-3.

Figure 13:
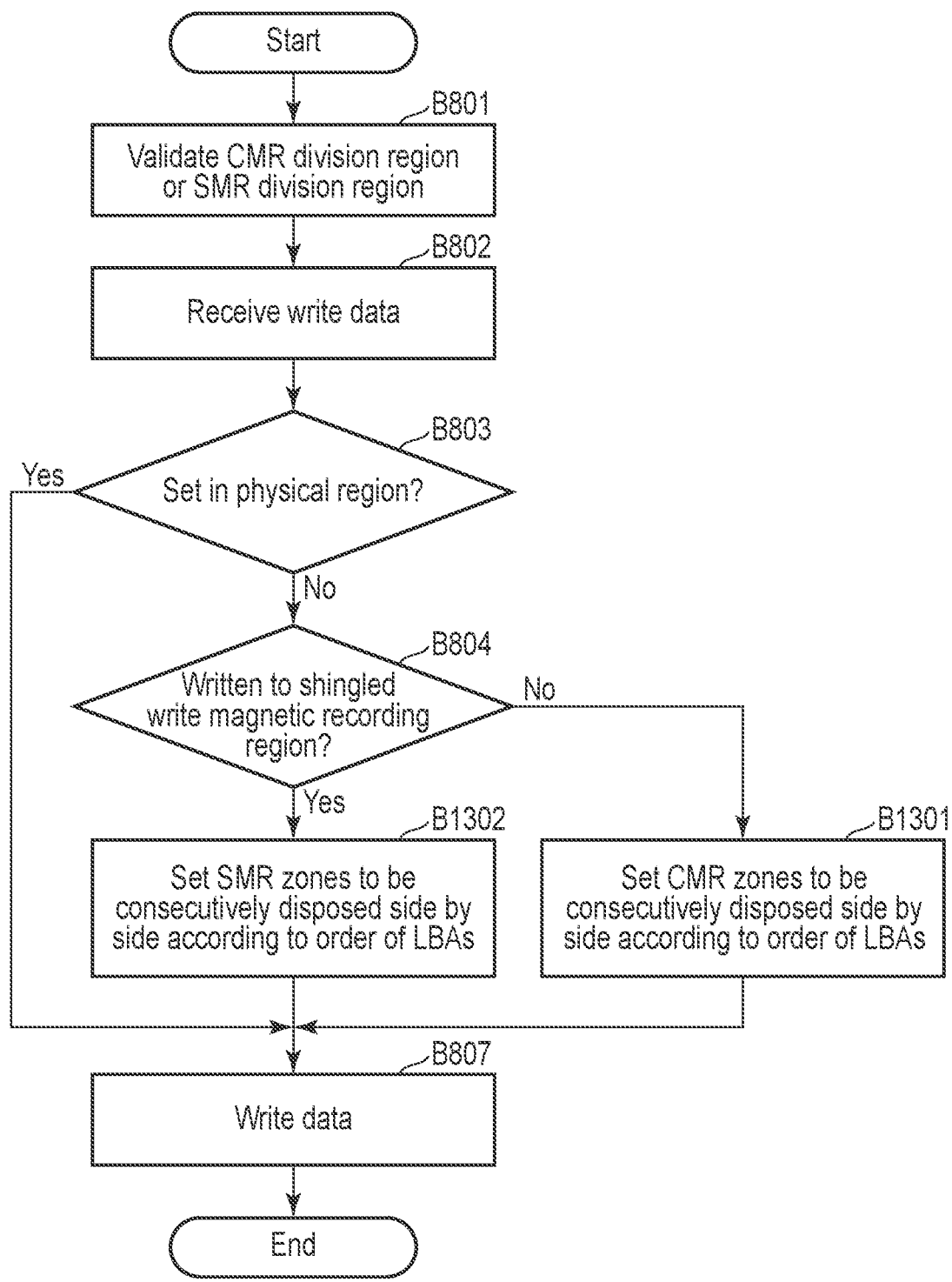
FIG. 13 is a flowchart showing an example of the setting method of the conventional magnetic recording region and the shingled write magnetic recording region according to Modification 2.

FIG. 13 is a flowchart showing an example of a method of setting the conventional magnetic recording region and the shingled write magnetic recording region according to Modification 2.

The MPU 60 validates the CMR division region and the SMR division region of the user data region 10*a* according to a command or an instruction from the host 100 or the like (B801) and responds to the host 100. The MPU 60 receives the write data (or command) transferred from the host 100 or the like (B802). The MPU 60 determines whether the recording region of the LBA corresponding to the received write data (or command) is set in the user data region 10*a* (B803).

When the recording region of the LBA corresponding to the received write data (or command) is set in the user data region 10*a* (YES in B803), the MPU 60 advances the process to B807. When the recording region of the LBA corresponding to the received write data (or command) is not set in the user data region 10*a* (NO in B803), the MPU 60 determines whether data is written to the shingled write magnetic recording region SR or to the conventional magnetic recording region CR (B804).

When it is determined that data is written to the conventional magnetic recording region CR (NO in B804), the MPU 60 sets the CMR zones to be consecutively disposed side by side in the validated CMR region according to the order of the LBAs (B1301), and advances the process to B807. When it is determined that data is written to the shingled write magnetic recording region SR (YES in B804), the MPU 60 sets the SMR zones to be consecutively disposed side by side in the validated SMR region according to the order of the LBAs (B1302), writes the data (B807), and ends the process.

According to Modification 2, the magnetic disk device 1 sets the CMR zones to be consecutively disposed side by side in the CMR division region according to the order of the LBAs, and set the SMR zones to be consecutively disposed side by side in the SMR division region according to the order of the LBAs. The magnetic disk device 1 sets the CMR zone and the SMR zone whose LBA has close values to the physically close region, so that it is possible to reduce latency to access when receiving a command to write data to the CMR zone and the SMR zone whose LBA has close values. Therefore, the magnetic disk device 1 can efficiently write data to the disk 10.

(Modification 3)

The magnetic disk device 1 of Modification 3 is different from the magnetic disk device 1 of the first embodiment, Modification 1, and Modification 2 described above in the method of setting the recording region.

In a particular radial region (hereinafter, may be referred to as a setting unit region) of the user data region 10*a*, the MPU 60 sets the particular radial region of the setting unit region in the CMR division region, and sets another radial region, of a setting unit region, different from this radial region in the SMR division region so as to minimize the unused region. In other words, the MPU 60 validates the CMR division region in the setting unit region and validates the SMR division region in the setting unit region so as to minimize the unused region in the setting unit region of the user data region 10*a*.

The MPU 60 sets the CMR zones in the order of the LBAs in the validated CMR region of the setting unit region, and sets the SMR zones in the order of the LBAs in the validated SMR region of the setting unit region. For example, the MPU 60 sets a plurality of the CMR zones corresponding to a plurality of LBAs with values close in the validated CMR region of a particular setting unit region, and sets a plurality of the SMR zones corresponding to a plurality of LBAs with values close in the validated SMR region of a particular setting unit region. For example, the MPU 60 sets the CMR zone corresponding to the small LBA in the validated CMR region of the setting unit region located in the outer circumference region OR, and sets the SMR zone corresponding to the small LBA in the validated SMR region of the setting unit region located in the outer circumference region OR. In addition, for example, the MPU 60 sets the CMR zone corresponding to the large LBA in the validated CMR region of the setting unit region located in the inner circumference region IR, and sets the SMR zone corresponding to the large LBA in the validated SMR region of the setting unit region located in the inner circumference region IR.

Figure 14:
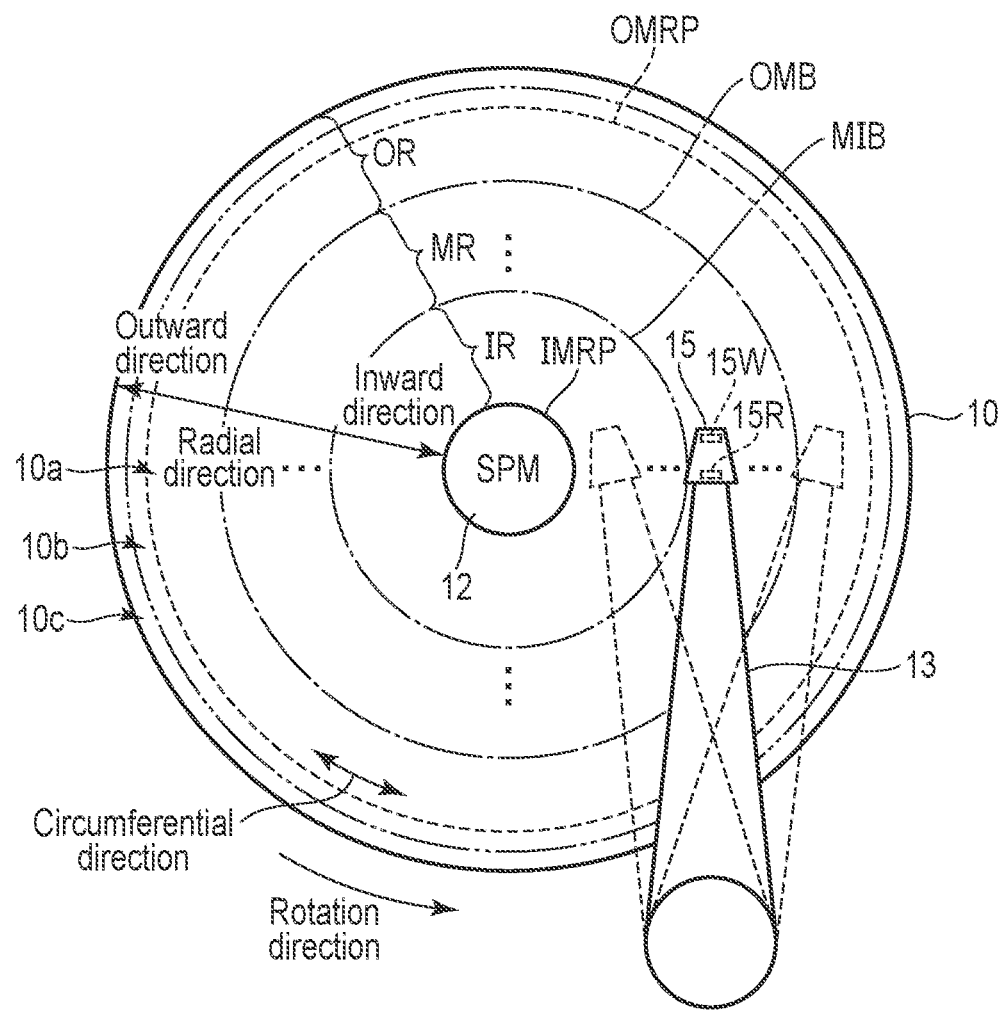
FIG. 14 is a schematic diagram showing an example of the disk according to Modification 3.

FIG. 14 is a schematic diagram showing an example of the disk 10 according to Modification 3. FIG. 14 corresponds to part of FIG. 2.

FIG. 14 shows the radial positions OMB and MIB. The radial position OMB is located inward of the radial position OMRP. The radial position OMB corresponds to the boundary between the outer circumference region OR and the middle circumference region MR. In FIG. 14, the radial region from the radial position OMRP to the radial position OMB corresponds to the outer circumference region OR. The radial position MIB is located inward of the radial position OMB and outward of the radial position IMRP. The radial position MIB corresponds to the boundary between the middle circumference region MR and the inner circumference region IR. In FIG. 14, the radial region from the radial position OMB to the radial position MIB corresponds to the middle circumference region MR. The radial region from the radial position MIB to the radial position IMRP corresponds to the inner circumference region IR.

Figure 15:
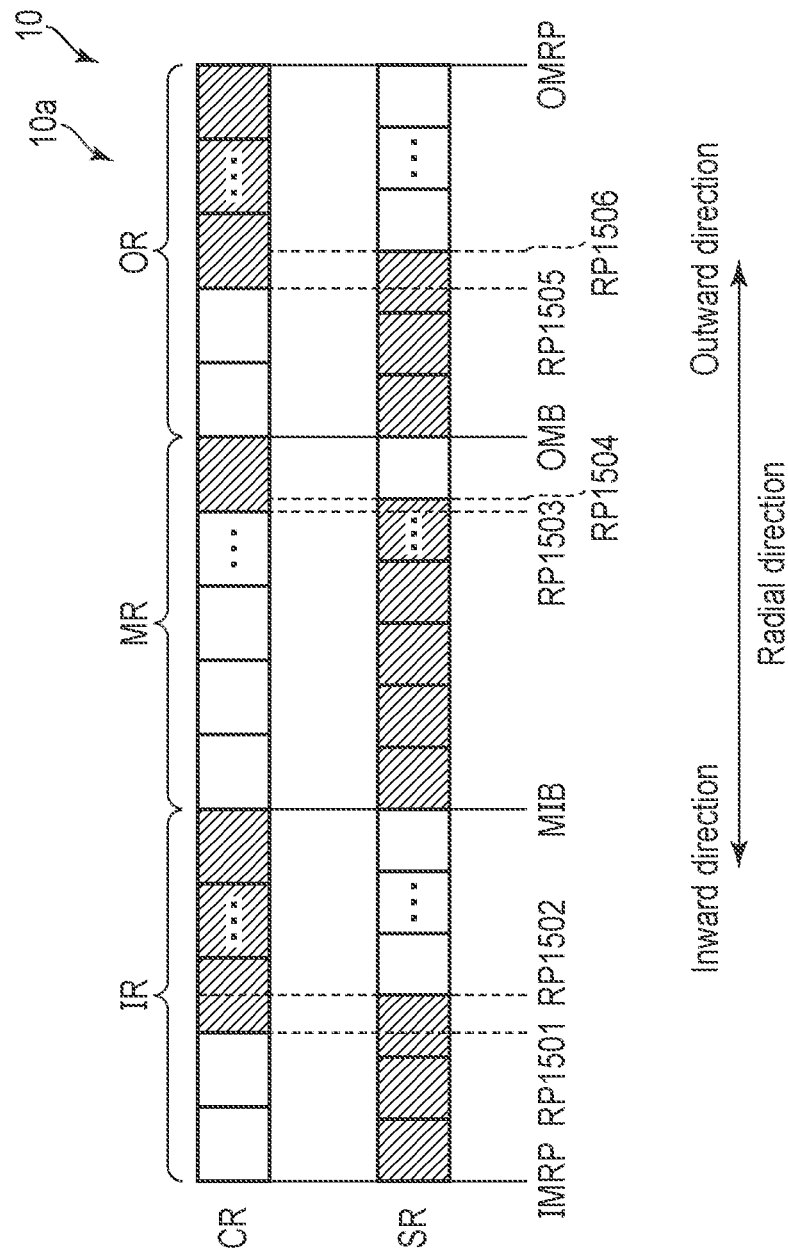
FIG. 15 is a schematic diagram showing an example of the physical arrangement of the CMR zone and the SMR zone according to Modification 3.

FIG. 15 is a schematic diagram showing an example of the physical arrangement of the CMR zone and the SMR zone according to Modification 3. FIG. 15 corresponds to FIG. 14. FIG. 15 shows the radial position IMRP, a radial position RP1501, a radial position RP1502, the radial position MIB, a radial position RP1503, a radial position RP1504, the radial position OMB, a radial position RP1505, a radial position RP1506, and the radial position OMRP. The radial position RP1501 is located outward of the radial position IMRP. The radial position RP1502 is located outward of the radial position RP1501 and inward of the radial position MIB. The radial position RP1503 is located outward of the radial position MIB. The radial position RP1504 is located outward of the radial position RP1503 and inward of the radial position OMB. The radial position RP1505 is located outward of radial position OMB. The radial position RP1506 is located outward of the radial position RP1505 and inward of the radial position OMRP. In FIG. 15, the radial region from the radial position IMRP to the radial position MIB corresponds to the inner circumference region IR. The radial region from the radial position MIB to the radial position OMB corresponds to the middle circumference region MR. The radial region from the radial position OMB to the radial position OMRP corresponds to the outer circumference region OR. In FIG. 15, each of the inner circumference region IR, the middle circumference region MR, and the outer circumference region OR corresponds to the setting unit region. The setting unit region may be a radial region smaller than the inner circumference region IR, the middle circumference region MR, and the outer circumference region OR.

In the example shown in FIG. 15, the MPU 60 validates the CMR division region from the radial position IMRP to the radial position RP1501 and validates the SMR division region from the radial position RP1502 to the radial position MIB in the inner circumference region IR of the user data region 10a. The MPU 60 validates the CMR division region from the radial position MIB to the radial position RP1503 and validates the SMR division region from the radial position RP1504 to the radial position OMB in the middle circumference region MR of the user data region 10a. The MPU 60 validates the CMR division region from the radial position OMB to the radial position RP1505 and validates the SMR division region from the radial position RP1506 to the radial position OMRP in the outer circumference region OR of the user data region 10a.

In the example shown in FIG. 15, the MPU 60 sets the CMR zone corresponding to the large LBA in the validated CMR region of the inner circumference region IR of the user data region 10a, and sets the SMR zone corresponding to the large LBA in the validated SMR region of the inner circumference region IR of the user data region 10a.

In the example shown in FIG. 15, the MPU 60 sets the CMR zone corresponding to the LBA that is smaller than the LBA of the CMR zone set in the validated CMR region of the inner circumference region IR and that is larger than the LBA of the CMR zone set in the validated CMR region of the outer circumference region OR in the validated CMR region of the middle circumference region MR of the user data region 10a. The MPU 60 sets the CMR zone corresponding to the LBA that is smaller than the LBA of the SMR zone set in the validated SMR region of the inner circumference region IR and that is larger than the LBA of the SMR zone set in the validated SMR region of the outer circumference region OR in the validated SMR region of the middle circumference region MR of the user data region 10a.

In the example shown in FIG. 15, the MPU 60 sets the CMR zone corresponding to the small LBA in the validated CMR region of the outer circumference region OR of the user data region 10a, and sets the SMR zone corresponding to the small LBA in the validated SMR region of the inner circumference region IR of the user data region 10a.

According to Modification 3, the magnetic disk device 1 validates the CMR division region in the setting unit region and validates the SMR division region in the setting unit region so as to minimize the unused region in the setting unit region of the user data region 10a. The magnetic disk device 1 sets a plurality of the CMR zones corresponding to a plurality of LBAs with values close in the validated CMR region of a particular setting unit region, and sets a plurality of the SMR zones corresponding to a plurality of LBAs with values close in the validated SMR region of a particular setting unit region. The magnetic disk device 1 can reduce the seek time when receiving a command to write data to the CMR zone and the SMR zone with the LBA having close values from the host 100 or the like. Therefore, the magnetic disk device 1 can efficiently write data to the disk 10.

Second Embodiment

The magnetic disk device 1 according to the second embodiment is different from the magnetic disk device 1 of the first embodiment, Modification 1, and Modification 2, and Modification 3 described above in that the setting method of the conventional magnetic recording region CR and the shingled write magnetic recording region SR is different for each disk 10 and each head 15.

The disk 10 has a plurality of disks 10. The head 15 has a plurality of heads 15. One head 15 faces one face of the disk 10.

FIG. 16 is a schematic diagram showing an example of the arrangement of the head 15 with respect to the disk 10 according to the second embodiment.

In the example shown in FIG. 16, the disk 10 has a disk 10-1, a disk 10-2, . . . , and a disk 10-N. The disks 10-1 to 10-N are stacked coaxially at intervals in one direction. The diameters of the disks 10-1 to 10-N are the same. The diameters of the disks 10-1 to 10-N may be different.

The disk 10-1 has a front face 10-1S and a back face 10-1B opposite the front face 10-1S. The front face 10-1S has a user data region 10-1aS, a media cache 10-1b5, and a system area 10-1c5. The back face 10-1B has a user data region 10-1aB, a media cache 10-1bB, and a system area 10-1cB.

The disk 10-2 has a front face 10-2S and a back face 10-2B opposite the front face 10-2S. The front face 10-2S faces the back face 10-1B. The front face 10-2S has a user data region 10-2a5, a media cache 10-2bS, and a system area 10-2cS. The back face 10-2B has a user data region 10-2aB, a media cache 10-2bB, and a system area 10-2cB.

The disk 10-N has a front face 10-NS and a back face 10-NB opposite the front face 10-NS. The front face 10-NS has a user data region 10-NaS, a media cache 10-NbS, and a system area 10-NcS. The back face 10-NB has a user data region 10-NaB, a media cache 10-NbB, and a system area 10-NcB.

In FIG. 2, the head 15 has a head 15-0, a head 15-1, a head 15-2, a head 15-3, ..., a head 15-(N−1), and a head 15-N. The head 15-0 faces the front face 10-1S. The head 15-0 writes data to the front face 10-1S and reads data from the front face 10-1S. The head 15-1 faces the back face 10-1B. The head 15-1 writes data to the back face 10-1B and reads the data from the back face 10-1B. The head 15-2 faces the front face 10-2S. The head 15-2 writes data to the front face 10-2S and reads data from the front face 10-2S. The head 15-3 faces the back face 10-2B. The head 15-1 writes data to the back face 10-2B and reads the data from the back face 10-2B. The head 15-(N−1) faces the front face 10-NS. The head 15-(N−1) writes data to the front face 10-NS and reads data from the front face 10-NS. The head 15-N faces the back face 10-NB. The head 15-N writes data to the back face 10-NB and reads the data from the back face 10-NB.

The MPU 60 preferentially sets the CMR zone in the validated CMR region of the user data region 10a of a disk 10, among a plurality of disks 10, corresponding to a head 15 for which the cumulative number of sectors written (hereinafter, may be referred to as the cumulative number of write sectors) or the cumulative number of times data of writing (hereafter, may be referred to as a cumulative writing count) in a plurality of heads 15 is small, compared with that for the other heads, and preferentially sets the SMR zone in the validated SMR region of the user data region 10a of a disk 10, among a plurality of disks 10, corresponding to a head 15 for which the cumulative number of write sectors or the cumulative writing count in a plurality of heads 15 is small, compared with that for the other heads. For example, the MPU 60 preferentially sets the CMR zone in the validated CMR region of the user data region 10a of a disk 10, among the plurality of disks 10, corresponding to a head 15 for which the cumulative number of write sectors or the cumulative writing count in a plurality of heads 15 is the smallest, and preferentially sets the SMR zone in the validated SMR region of the user data region 10a of a disk 10, among the plurality of disks 10, corresponding to a head 15 for which the cumulative number of write sectors or the cumulative writing count in a plurality of heads 15 is the smallest.

FIG. 17 is a flowchart showing an example of a recording region setting method according to the second embodiment.

The MPU 60 validates the CMR division region and the SMR division region of the user data region 10a according to a command or instruction from the host 100 or the like (B801) and responds to the host 100 (B802).

The MPU 60 receives the write data (or command) transferred from the host 100 or the like. The MPU 60 determines whether the recording region of the LBA corresponding to the received write data (or command) is set in the user data region 10a (B803).

When the recording region of the LBA corresponding to the received write data (or command) is set in the user data region 10a (YES in B803), the MPU 60 advances the process to B807. When the recording region of the LBA corresponding to the received write data (or command) is not set in the user data region 10a (NO in B803), the MPU 60 determines whether data is written to the shingled write magnetic recording region SR or to the conventional magnetic recording region CR (B804).

When it is determined that data is written to the conventional magnetic recording region CR (NO in B804), the MPU 60 preferentially sets the CMR zone in the validated CMR region of the user data region 10a of a disk 10, among the plurality of disks 10, corresponding to a head 15 having a small cumulative number of write sectors among the plurality of heads 15 (B1701), and advances the process to B807. When it is determined that data is written to the shingled write magnetic recording region SR (YES in B804), the MPU 60 preferentially sets the SMR zone in the validated SMR region of the user data region 10a of a disk 10, among the plurality of disks 10, corresponding to a head 15 having a small cumulative number of write sectors among the plurality of heads 15 (B1702), writes the data (B807), and ends the process.

According to the second embodiment, the magnetic disk device 1 preferentially sets the CMR zone in the validated CMR region of the user data region 10a of a disk 10, among the plurality of disks 10, corresponding to a head 15 for which the cumulative number of write sectors in a plurality of heads 15 is small, and preferentially sets the SMR zone in the validated SMR region of the user data region 10a of a disk 10, among the plurality of disks 10, corresponding to a head 15 for which the cumulative number of write sectors in a plurality of heads 15 is small. Since the magnetic disk device 1 can make the cumulative number of write sectors of each head 15 uniform, it is possible to suppress a decrease in quality (hereinafter, may be referred to as write quality) of a specific head 15 among a plurality of heads 15 when data is written. Therefore, the reliability of the magnetic disk device 1 can be improved.

(Modification 4)

The magnetic disk device 1 according to Modification 4 is different from the magnetic disk device 1 of the first embodiment, Modification 1, and Modification 2, Modification 3, and the second embodiment described above in that the setting method of the conventional magnetic recording region CR and the shingled write magnetic recording region SR is different for each disk 10 and each head 15.

A plurality of disks (10-1 to 10-N) and a plurality of heads 15 (15-0 to 15-N) may have different characteristics of the disk 10 and the head 15, for example, the characteristics of the influence of leakage magnetic flux or the like (Adjacent Track Interference: ATI) on the recording region located in the radial direction. The characteristics of the disk 10 and the characteristics of the head 15 are measured in the manufacturing process and may be recorded in a particular recording region, for example, the system area of the disk 10, the nonvolatile memory 80, or the like.

The MPU 60 preferentially sets the CMR zone in the validated CMR region of the user data region 10a of a disk 10, among the plurality of disks 10, corresponding to a head 15 having a particular characteristic among the plurality of heads 15, and preferentially sets the SMR zone in the validated SMR region of the user data region 10a of a disk 10, among the plurality of disks 10, corresponding to a head 15 having a particular characteristic among the plurality of heads 15. For example, since the MPU 60 can repeatedly write data to a particular recording region in the conventional magnetic recording, the MPU 60 preferentially sets the CMR zone in the validated CMR region in the user data region 10a of a disk 10, among a plurality of disks 10, corresponding a head 15 for which the ATI (influence of leakage magnetic flux or the like) on the recording region located in the radial direction among a plurality of heads 15 is small, compared with that for the other heads, and since the MPU 60 less repeatedly write data in the shingled write magnetic recording, compared with the conventional magnetic recording, the MPU 60 preferentially sets the SMR zone in the validated SMR region in the user data region 10a of a disk 10, among a plurality of disks 10, corresponding a head 15 for which the ATI (influence of leakage magnetic flux or the like) on the recording region located in the radial direction among a plurality of heads 15 is large, compared with that for the other heads. For example, the MPU 60 preferentially sets the CMR zone in the validated CMR region in the user data region 10a of a disk 10, among a plurality of disks 10, corresponding a head 15 for which the ATI characteristic on the recording region located in the radial direction among a plurality of heads 15 is the smallest, and preferentially sets the SMR zone in the validated SMR region in the user data region 10a of a disk 10, among a plurality of disks 10, corresponding a head 15 for which the ATI characteristic on the recording region located in the radial direction among a plurality of heads 15 is the largest.

FIG. 18 is a flowchart showing an example of the setting method of the recording region according to Modification 4.

The MPU 60 validates the CMR division region and the SMR division region of the user data region 10a according to a command or an instruction from the host 100 or the like (B801) and responds to the host 100. The MPU 60 receives the write data (or command) transferred from the host 100 or the like (B802). The MPU 60 determines whether the recording region of the LBA corresponding to the received write data (or command) is set in the user data region 10a (B803).

When the recording region of the LBA corresponding to the received write data (or command) is set in the user data region 10a (YES in B803), the MPU 60 advances the process to B807. When the recording region corresponding to the received write data (or command) is not set in the user data region 10a (NO in B803), the MPU 60 determines whether data is written to the shingled write magnetic recording region SR or to the conventional magnetic recording region CR (B804).

When it is determined that data is written to the conventional magnetic recording region CR (NO in B804), the MPU 60 preferentially set the CMR zone in the validated CMR region in the user data region 10a of a disk 10, among the plurality of disks 10, corresponding to a head 15 for which the ATI (influence of leakage magnetic flux or the like) on the recording region located in the radial direction among the plurality of heads 15 is small (B1801), and advances the process to B807. When it is determined that data is written to the shingled write magnetic recording region SR (YES in B804), the MPU 60 preferentially sets the SMR zone in the validated SMR region in the user data region 10a of a disk 10, among the plurality of disks 10, corresponding to a head 15 for which the ATI (influence of leakage magnetic flux or the like) on the recording region located in the radial direction among the plurality of heads 15 is large (B1802), write the data (B807), and ends the process.

According to Modification 4, the magnetic disk device 1 preferentially set the CMR zone in the validated CMR region in the user data region 10a of a disk 10, among the plurality of disks 10, corresponding to a head 15 for which the ATI (influence of leakage magnetic flux or the like) on the recording region located in the radial direction among the plurality of heads 15 is small, and preferentially set the SMR zone in the validated SMR region in the user data region 10a of a disk 10, among the plurality of disks 10, corresponding to a head 15 for which the ATI (influence of leakage magnetic flux or the like) on the recording region located in the radial direction among the plurality of heads 15 is large. The magnetic disk device 1 can reduce the loss of data due to the ATI or the like. Therefore, the reliability of the magnetic disk device 1 can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   at least one disk having a user data region;
   at least one head that writes data to the at least one disk and that reads data from the at least one disk; and
   a controller that disposes a plurality of conventional magnetic recording division regions each non-corresponding to LBAs obtained by dividing the user data region in a radial direction for each first width and a plurality of shingled write magnetic recording division regions each non-corresponding to the LBAs obtained by dividing the user data region in the radial direction for each second width different from the first width in the user data region, assigns, when receiving a command to write data to a first LBA with a conventional magnetic recording in which a plurality of tracks is written at intervals in the radial direction, a first conventional magnetic recording region corresponding to the first LBA to a first conventional magnetic recording division region among the conventional magnetic recording division regions, and assigns, when receiving a command to write data to a second LBA with a shingled write magnetic recording in which a plurality of tracks is overwritten in the radial direction, a first shingled write magnetic recording region corresponding to the second LBA to a first shingled write magnetic recording division region among the shingled write magnetic recording division regions,
   wherein
   the first conventional magnetic recording region corresponding to the first LBA and the first shingled write magnetic recording region corresponding to the second LBA do not overlap each other.

2. The magnetic disk device according to claim 1, wherein the controller consecutively disposes the conventional magnetic recording division regions from a first end of the user data region in the radial direction toward a second end opposite to the first end, and consecutively disposes the shingled write magnetic recording division regions from the second end of the user data region toward the first end.

3. The magnetic disk device according to claim 2, wherein the first conventional magnetic recording division region corresponding to the first LBA is located at the first end, and the first shingled write magnetic recording division region corresponding to the second LBA is located at the second end.

4. The magnetic disk device according to claim 3, wherein the controller sets, when receiving a command to write data to a third LBA with the conventional magnetic recording, a second conventional magnetic recording region corresponding to the third LBA to a second conventional magnetic recording division region adjacent to the first conventional magnetic recording division region among the conventional magnetic recording division regions in the radial direction, and the controller sets, when receiving a command to write data to a fourth LBA with the shingled write magnetic recording, a second shingled write magnetic recording region corresponding to the fourth LBA to a second shingled write magnetic recording division region adjacent to the first shingled write magnetic recording division region among the shingled write magnetic recording division regions in the radial direction.

5. The magnetic disk device according to claim 3, wherein the controller sets, when receiving a command to write data to a third LBA next to the first LBA with the conventional magnetic recording, a second conventional magnetic recording region corresponding to the third LBA to a second conventional magnetic recording division region adjacent to the first conventional magnetic recording division region among the conventional magnetic recording division regions in the radial direction, and the controller sets, when receiving a command to write data to a fourth LBA next to the second LBA with the shingled write magnetic recording, a second shingled write magnetic recording region corresponding to the fourth LBA to a second shingled write magnetic recording division region adjacent to the first shingled write magnetic recording division region among the shingled write magnetic recording division regions in the radial direction.

6. The magnetic disk device according to claim 1, wherein the at least one disk includes a plurality of disks, wherein the at least one head includes a plurality of heads, and wherein
the controller preferentially sets the first conventional magnetic recording region in a first disk, among the disks, corresponding to a head, among the heads, for which the number of times that writing is performed is small, compared with the number of times for the other heads, and preferentially sets the first shingled write magnetic recording region in the first disk corresponding to a head, among the heads, for which the number of times that writing is performed is small, compared with the number of times for the other heads.

7. The magnetic disk device according to claim 1, wherein the at least one disk includes a plurality of disks, wherein the at least one head includes a plurality of heads, and wherein
the controller sets the first conventional magnetic recording region in a first disk, among the disks, corresponding to a head, among the heads, for which the number of times that writing is performed is the smallest, and sets the first shingled write magnetic recording region in the first disk corresponding to a head, among the heads, for which the number of times that writing is performed is the smallest.

8. The magnetic disk device according to claim 1, wherein the at least one disk includes a plurality of disks, wherein the at least one head includes a plurality of heads, and wherein
the controller preferentially sets the first conventional magnetic recording region in a first disk, among the disks, corresponding to a head, among the heads, for which an influence of a leakage magnetic flux is small, compared with an influence of a leakage magnetic flux for the other heads, and preferentially sets the first shingled write magnetic recording region in a second disk, among the disks, corresponding to a head, among the heads, for which an influence of a leakage magnetic flux is large, compared with an influence of a leakage magnetic flux for the other heads.

9. The magnetic disk device according to claim 1, wherein the at least one disk includes a plurality of disks, wherein the at least one head includes a plurality of heads, and wherein
the controller preferentially sets the first conventional magnetic recording region in a first disk, among the disks, corresponding to a head, among the heads, for which an influence of a leakage magnetic flux is the smallest, and preferentially set the first shingled write magnetic recording region in a second disk, among the disks, corresponding to a head, among the heads, for which an influence of a leakage magnetic flux is the largest.

10. A method of setting a recording region, the method applied to a magnetic disk device including at least one disk having a user data region, and at least one head that writes data to the at least one disk and that reads data from the at least one disk, the method comprising:
disposing a plurality of conventional magnetic recording division regions each non-corresponding to LBAs obtained by dividing the user data region in a radial direction for each first width and a plurality of shingled write magnetic recording division regions each non-corresponding to the LBAs obtained by dividing the user data region in the radial direction for each second width different from the first width in the user data region;
assigning, when receiving a command to write data to a first LBA with a conventional magnetic recording in which a plurality of tracks is written at intervals in the radial direction, a first conventional magnetic recording region corresponding to the first LBA to a first conventional magnetic recording division region among the conventional magnetic recording division regions; and
assigning, when receiving a command to write data to a second LBA with a shingled write magnetic recording in which a plurality of tracks is overwritten in the radial direction, a first shingled write magnetic recording region corresponding to the second LBA to a first shingled write magnetic recording division region among the shingled write magnetic recording division regions,
wherein
the first conventional magnetic recording region corresponding to the first LBA and the first shingled write magnetic recording region corresponding to the second LBA do not overlap each other.

11. The method of setting the recording region according to claim 10, further comprising:
consecutively disposing the conventional magnetic recording division regions from a first end of the user data region in the radial direction toward a second end opposite to the first end, and
consecutively disposing the shingled write magnetic recording division regions from the second end of the user data region toward the first end.

12. The method of setting the recording region according to claim 11, wherein the first conventional magnetic recording division region corresponding to the first LBA is located at the first end, and the first shingled write magnetic recording division region corresponding to the second LBA is located at the second end.

13. The method of setting the recording region according to claim 12, further comprising:
setting, when receiving a command to write data to a third LBA with the conventional magnetic recording, a second conventional magnetic recording region corresponding to the third LBA to a second conventional magnetic recording division region adjacent to the first conventional magnetic recording division region among the conventional magnetic recording division regions in the radial direction, and
setting, when receiving a command to write data to a fourth LBA with the shingled write magnetic recording, a second shingled write magnetic recording region corresponding to the fourth LBA to a second shingled write magnetic recording division region adjacent to the first shingled write magnetic recording division region among the shingled write magnetic recording division regions in the radial direction.

14. The method of setting the recording region according to claim 12, further comprising:
setting, when receiving a command to write data to a third LBA next to the first LBA with the conventional magnetic recording, a second conventional magnetic recording region corresponding to the third LBA to a second conventional magnetic recording division region adjacent to the first conventional magnetic recording division region among the conventional magnetic recording division regions in the radial direction, and
setting, when receiving a command to write data to a fourth LBA next to the second LBA with the shingled write magnetic recording, a second shingled write magnetic recording region corresponding to the fourth LBA to a second shingled write magnetic recording division region adjacent to the first shingled write magnetic recording division region among the shingled write magnetic recording division regions in the radial direction.

15. The method of setting the recording region according to claim 10, wherein the at least one head includes a plurality of heads and the at least one disk includes a plurality of disks, and wherein the method includes
preferentially setting the first conventional magnetic recording region in a first disk, among the disks, corresponding to a head, among the heads, for which the number of times that writing is performed is small, compared with the number of times for the other heads, and
preferentially setting the first shingled write magnetic recording region in the first disk corresponding to a head, among the heads, for which the number of times that writing is performed is small, compared with the number of times for the other heads.

16. The method of setting the recording region according to claim 10, wherein the at least one head includes a plurality of heads and the at least one disk includes a plurality of disks, and wherein the method includes
setting the first conventional magnetic recording region in a first disk, among the disks, corresponding to a head, among the heads, for which the number of times that writing is performed is the smallest, and
setting the first shingled write magnetic recording region in the first disk corresponding to a head, among the heads, for which the number of times that writing is performed is the smallest.

17. The method of setting the recording region according to claim 11, wherein the at least one head includes a plurality of heads and the at least one disk includes a plurality of disks, and wherein the method includes
preferentially setting the first conventional magnetic recording region in a first disk, among the disks, corresponding to a head, among the heads, for which an influence of a leakage magnetic flux is small, compared with an influence of a leakage magnetic flux for the other heads, and
preferentially setting the first shingled write magnetic recording region in a second disk among the disks corresponding to a head, among the heads, for which an influence of a leakage magnetic flux is large, compared with an influence of a leakage magnetic flux for the other heads.

18. The method of setting the recording region according to claim 10, wherein the at least one head includes a plurality of heads and the at least one disk includes a plurality of disks, and wherein the method includes
setting the first conventional magnetic recording region in a first disk, among the disks, corresponding to a head, among the heads, for which an influence of a leakage magnetic flux is the smallest, and
setting the first shingled write magnetic recording region in a second disk among the disks corresponding to a head, among the heads, for which an influence of a leakage magnetic flux is the largest.

* * * * *